United States Patent
Sanchez et al.

(10) Patent No.: US 11,856,674 B1
(45) Date of Patent: Dec. 26, 2023

(54) CONTENT-BASED LIGHT ILLUMINATION

(71) Applicant: Amazon Technologies, Inc., Seattle, WA (US)

(72) Inventors: Juan Antonio Sanchez, Seattle, WA (US); Kenneth Tyler Louie, Dana Point, CA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 16/883,041

(22) Filed: May 26, 2020

(51) Int. Cl.
| H05B 47/175 | (2020.01) |
| H05B 47/12 | (2020.01) |
| G06F 3/04847 | (2022.01) |
| G06F 3/16 | (2006.01) |

(52) U.S. Cl.
CPC ....... *H05B 47/175* (2020.01); *G06F 3/04847* (2013.01); *G06F 3/167* (2013.01); *H05B 47/12* (2020.01)

(58) Field of Classification Search
USPC ........................................................ 715/740
See application file for complete search history.

(56) References Cited

U.S. PATENT DOCUMENTS

| 7,139,617 B1 * | 11/2006 | Morgan | H05B 47/155 |
| | | | 700/17 |
| 9,986,622 B2 * | 5/2018 | Min | H05B 45/00 |
| 2005/0275626 A1 * | 12/2005 | Mueller | H05B 47/125 |
| | | | 345/156 |
| 2008/0258679 A1 * | 10/2008 | Manico | H02J 7/0042 |
| | | | 320/106 |
| 2010/0146154 A9 * | 6/2010 | Stephan | G06F 9/4411 |
| | | | 710/10 |
| 2011/0320998 A1 * | 12/2011 | Perry | G06F 30/00 |
| | | | 716/122 |
| 2015/0022123 A1 * | 1/2015 | Van De Sluis | H05B 47/10 |
| | | | 315/312 |
| 2019/0121522 A1 * | 4/2019 | Davis | H04N 9/3185 |
| 2021/0064223 A1 * | 3/2021 | Pruitt | G06F 1/3265 |
| 2021/0235568 A1 * | 7/2021 | Rattray | H04W 4/21 |

* cited by examiner

*Primary Examiner* — Matthew Ell
*Assistant Examiner* — Conrad R Pack
(74) *Attorney, Agent, or Firm* — Lee & Hayes, P.C.

(57) ABSTRACT

Systems and methods for content-based light illuminations are disclosed. For example, a user interface may be utilized to receive and/or determine a configuration of a light array associated with a connected device. The configuration may be utilized to generate a visual representation of the light array, which may be overlaid on a display window that is configured to display content to be utilized for generating light illumination sequences. Color changes associated with each light representation of the visual representation may be determined based at least in part on the positioning and area of the display window associated with the light representations, and corresponding illumination data may be generated and sent to the connected device.

20 Claims, 12 Drawing Sheets

CONTENT-BASED LIGHT ILLUMINATION

BACKGROUND

Electronic devices may include an array of lights. Different devices may have differing light arrays, including light spacing differences and light capability differences. Described herein are improvements in technology and solutions to technical problems that can be used to, among other things, improve utilization of light arrays on devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
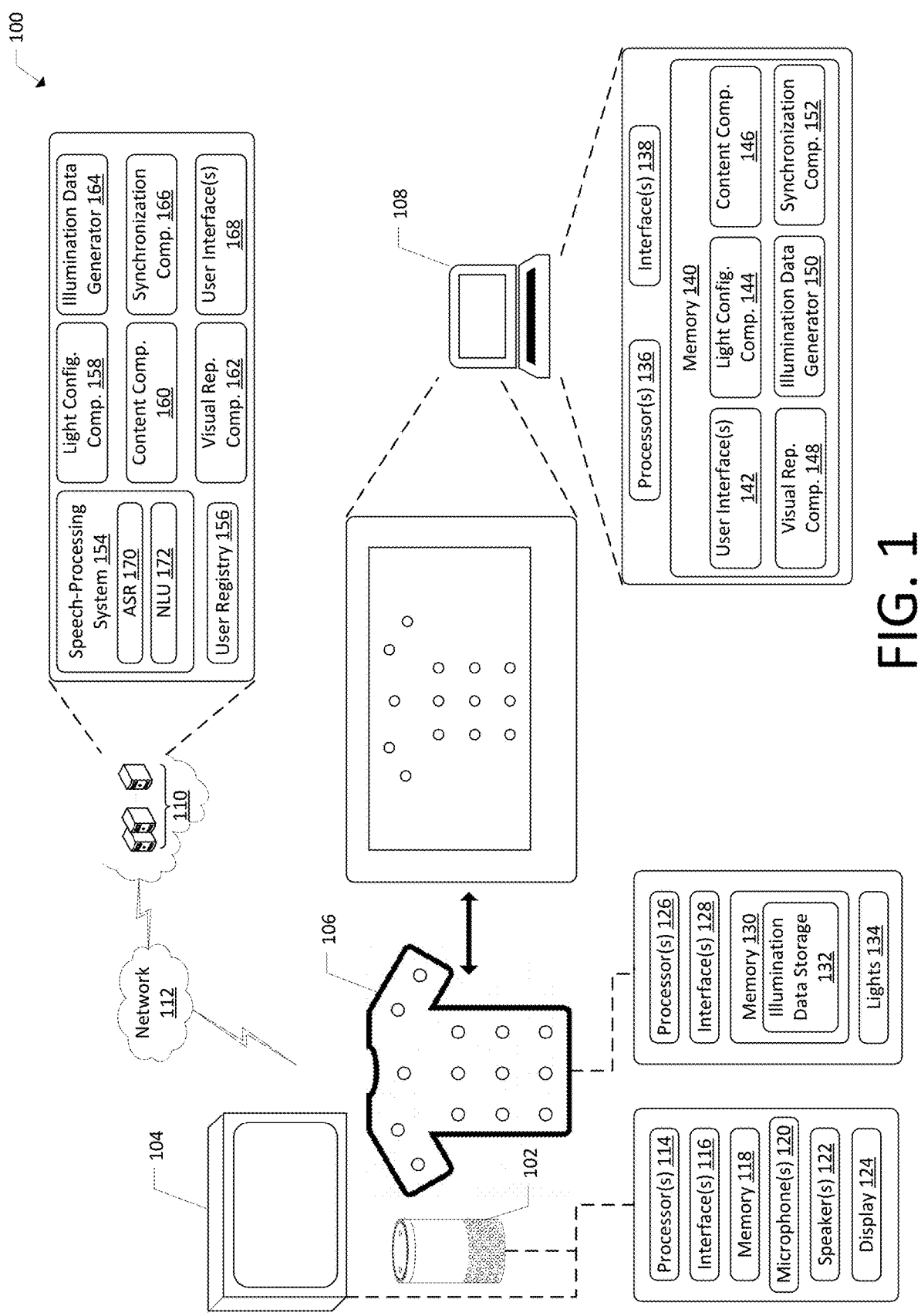
FIG. 1 illustrates a schematic diagram of an example environment for content-based light illumination.

Systems and methods for content-based light illuminations are disclosed. Take, for example, an environment such as a home where one or more electronic devices may be present. In some examples, at least a portion of those electronic devices may be configured to display images, such as video, and/or to output audio, such as audio associated with the video. The electronic devices may also be configured to receive user utterances and perform operations associated with those user utterances. For example, the electronic devices may include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboards, etc.), and other types of connected electronic devices (e.g., devices that have one or more light arrays). These electronic devices may be situated in a home, a place a business, healthcare facility (e.g., hospital, doctor's office, pharmacy, etc.), vehicle (e.g., airplane, truck, car, bus, etc.), a public forum (e.g., shopping center, store, etc.), among other environments.

In examples, the connected devices may be configured to output light from a light array of a given connected device. The light arrays may vary based on the type of connected device, the capabilities of the connected device, design choices associated with the connected device, and/or other factors. For example, a given connected device may be a shirt, other garment, or other wearable. The light array can be on the front of the shirt. As another example, a different network-connected device, such as a handheld device (e.g., "magic" wand), tree, etc. can have its own light array. The light arrays associated with various connected devices may have a number of differences, such as the number of lights in the light array, the position of lights with respect to each other, distances between lights, light sizes, light capabilities, etc. The light arrays of these connected devices may be caused to emit light, such as a Christmas tree being caused to emit constant light from each light in its light array, and/or to emit intermittent (blinking) light, for example. It may be desirable to have the light arrays emit a lighting sequence, such as an sequence that mimics or is otherwise associated with a light illumination sequence or other video content. For example, it may be desirable to have a princess dress that is a connected device and is able to emit light in a pattern that mimics (e.g., similar/same colors from and in synchronization with) a movie, such that at a given time while the movie is playing on another electronic device in the same environment as the shirt connected device.

Described herein are systems and methods for generating light sequence illuminations from image data (including a sequence of image data with respect to time, namely video data) and associating the sequences of illuminations with devices having light arrays. For example, one or more user interfaces may be generated and may be configured to perform operations associated with device-based light illuminations. For example, the user interfaces may be utilized to receive user input for generating light illuminations and/or for displaying information for a user of the user interfaces to utilize for generating light illumination sequences. The user interfaces may be displayed on one or more computing devices having a screen and being configured to receive user input. The computing devices may include one or more components that may be utilized for device-based light sequence generation, and/or the computing devices may have access to one or more remote systems that have the components to be utilized for device-based light illuminations generation. For example, the components may include the one or more user interfaces, a light configuration component, a content component, a visual representation component, an illuminations data generator, and/or a synchronization component.

The light configuration component may be configured to receive and/or determine configuration data indicating a configuration of a light array of a given connected device. As described herein, the light array of a given connected device may include attributes that may vary amongst light arrays, such as the number of lights, the positioning of the lights (e.g., the distance(s) between lights, direction lights are facing in 3D space, etc.), the capabilities of the lights, the sizes of the lights, the types of the lights, etc. The light configuration component may be configured to receive information associated with these attributes for use by the computing device for generating light illumination sequences. In examples, user input may be received, such as via the user interfaces, that indicates the light configuration. For example, a user may utilize the user interfaces to provide user input indicating the number of lights in the light array, light spacing, light capabilities, etc. In other examples, the light configuration component may query the connected device with the light array and/or a remote system associated with the connected device for the light configuration data. For example, the connected device and/or the associated remote system may store data indicating the light configuration and may provide that data to the light configuration component in response to a request for such information. In still other examples, light configurations may be predetermined and stored in association with the computing device, and those light configurations may be associated with device types, light array types, etc. A user may utilize the user interfaces to select a device type and/or a light array type, and the light configuration associated with that selection may be utilized as the light configuration for the connected device at issue.

The visual representation component may be configured to utilize the light configuration data to generate visual representation data of the lights in the light array. A given visual representation may indicate some or all of the attributes of a given light array, such as the number of lights in the light array, spacing and distances between lights, etc. For example, if a shirt connected device has 14 lights on a front side of the device, with two lights on each sleeve of the shirt and 10 lights on the body portion of the shirt, the visual representation associated with that light array may indicate that arrangement of lights. In examples, an outline or other indication of the connected device itself may also be included in the visual representation. The visual representation component may be configured to generate visual representation data representing the visual representation of a given light array, and to cause display of the visual representation on a screen of the computing device, such as via the user interfaces.

Additionally, the content component may be configured to retrieve content data for use in generating the light illumination data as described herein. For example, the content component may be utilized to receive user input indicating a selection of content to be utilized. For example, the content data may represent a movie or other type of visual content and include image data. The content component may retrieve (e.g., request and receive) the content data from one or more databases, such as a content database associated with the computing device, with one or more other electronic devices, and/or one or more remote systems, such as systems that allow for streaming content services. Images corresponding to the content data may be displayed on a display window of a user interface for light illumination sequence generation. The user interface may also include a progress bar indicating which portion of the content as a whole is associated with the currently-displayed images. The visual representation of the light array may also be displayed in the display window, such as in the form of an overlay on the images being displayed.

The user interface may now include functionality that may allow a user to indicate what portion of the selected content is to be utilized for generating a light illumination sequence and the area of the images that is to be associated with each light representation in the visual representation of the light array. For example, utilizing the progress bar for example, user input may be received indicating which portion of the content is to be utilized for generating light illumination sequences. The user may slide a selection bar associated with the progress bar to indicate which portion of the content is to be utilized. The amount of the content may also be changed utilizing the selection bar, such that increasing the size of the selection bar may increase the portion of the content while decreasing the size of the selection bar may decrease the portion of the content. Additionally, the visual representation may be configured to be manipulated via user input to change which areas of the display window are associated with each light representation. For example, each light representation may be moved about the display window, allowing the user to select which area of the images being displayed is to be associated with a given light representation. Additionally, user input may be provided that indicates the size and/or shape of the area to be associated with each light representation. For example, a user may utilize the user interface to change the size and/or shape of a given light representation, and in doing so may indicate the area to attribute to the light representation. It should be understood that each light representation may be associated with the same size and/or shape of area of the images to be attributed to each light representation, and/or some or all of the sizes and/or shapes may differ. In addition to the above, the user interface may be utilized to add a light representation and/or to remove a light representation from the visual representation of the light array.

The user interface may also include functionality to aid in testing light illumination sequences prior to generation of the light illumination data to be sent to the connected device. For example, the user interface may include a preview illumination element, which, when selected, may cause the portion of the content to be output on the display window of the user interface as well as cause the visual representation to provide an indication of the illumination sequence that would be generated given the placement of the visual representation on the display window. By so doing, the user may utilize the illumination sequence preview to iterate how the illumination sequence is to be generated, such as by changing the position of one or more of the light representations, the size and/or shape of the area attributable to the light representations, the portion of the content being utilized, the duration of the content being utilized, etc.

Once the placement and/or configuration of the visual representation has been confirmed by the user, the computing device may utilize the illumination sequence data generator to generate illumination data for each light representation in the visual representation of the light array. To do so, the illumination sequence data generator may determine, for some or all of the light representations, a color to attribute to the light representation per frame of the content data and/or per a set of frames. In examples, timing indicators, such as timing indicators associated with metadata of the illumination data may be utilized for synchronizing the output of the lighting sequence by the connected device and the output of other media, such as images, by one or more other devices. For example, the images utilized to generate the illumination data may be timestamped with respect to the entirety of the movie, for example, that those images are part of. Such timestamps may be utilized to determine when the light sequence is to begin on the connected device as well as when light color transitions are to occur such that the light sequence output by the connected device mimic the output of lights in the images displayed on the video interface device. By so doing, the light illumination data may indicate, for each light representation, color changes to attribute to the corresponding light over a period of time corresponding to the portion of the content that was selected. The result may be that the light array is caused to emit lights that correspond to the color changes, which may be similar color changes occurring with respect to the content when displayed. In these examples, the light sequence may mimic or otherwise be associated with the content that is displayed.

To determine a color to attribute to a light representation for a given frame of the content and/or set of frames, the position of the light representation in the display portion of the user interface as well as the size and/or shape of the area attributable to light representation may be utilized. The illumination sequence data generator may determine, for each light representation, a color that is representative of the colors in the area attributable to the light representation. Determining the representative color may be based at least in part on a most common color in the area, an averaging of colors such as by assigning a value to colors and determining an average of such values, determining which color is associated with the greatest portion of the area, etc. The illumination sequence data generator may then determine which color to attribute to the light representation for the frame and/or set of frames at issue based at least in part on the representative color and, in examples, the capabilities associated with the light array. For example, some light arrays may be configured to display more colors and/or shades of colors than other light arrays. The illumination sequence data generator may utilize data associated with the light capabilities to determine a color that is most similar to the representative color determined for the light representation. In some examples, the determined color may be the representative color, such as in situations where the capabilities of the light array allow for emission of light having the representative color. In other examples, the determined color may be a variant of the representative color, such as in situations where the capabilities of the light array do not allow for emission of light having the representative color. This process may be repeated, in whole or in part, for the other frames and/or sets of frames associated with the selected portion of the content and/or for each of the other light representations in the visual representation. The result of this process may be light illumination data indicating colors to be emitted from the light array and/or color transitions. This light illumination data may be packaged or otherwise formatted for sending to the connected device having the light array. The connected device may receive the formatted light illumination data and may store the light illumination data in an illumination data storage of the connected device. The light illumination data may then be utilized to cause one or more processors of the connected device to perform operations, such as causing the lights in the light array to emit light in the pattern indicated by the light illumination data.

In examples, a synchronization component may be configured to synchronize the light sequence with the portion of the content utilized to generate the light illumination data. For example, a user may desire not just to generate a light illumination sequence that mimics or is otherwise associated with the portion of the content, but also to have the connected device emit the animated light in synchronization with the output of the content on an associated electronic device. For example, when the content is a movie, images corresponding to the movie may be output by an electronic device, such as a television. When the portion of the movie that was utilized to generate the illumination data, and/or that is otherwise indicated to be associated with the light sequence, is output by the television, the connected device may be caused to perform the light sequence such that output of light by the connected device is synchronized with output of images of the movie. To do so, the synchronization component may generate synchronization data indicating a start time for the portion of the content as well as, in examples, time stamps associated with transitions of colors in the light sequence. The connected device may utilize the synchronization data to determine when to initiate the light sequence and how long to cause a given light in the light array to emit a given color and when to transition to the next color in the light sequence.

In examples where the light sequence is to be performed in synchronization with display of the content, synchronized output may be performed in one or more ways. For example, the connected device and/or the video interface device may be configured to determine whether the connected device is enabled and/or is in a state indicating that the connected device is ready to emit light corresponding to the light sequence. In examples, such an indication may be based at least in part on device beaconing between the devices, user input data, user account data indicating device configurations of devices associated with a user account, etc. Additionally, the illumination data may be sent to the connected device at one or more times. For example, the illumination data may be stored on the connected device prior to acquisition by a user, during an out-of-the-box experience, in response to a user request for the illumination data, when the content is requested and/or acquired by the video interface device, as part of an update to the connected device, etc. By so doing, multiple light sequences may be stored and utilized by the connected device over time and/or different light sequences may be stored on the connected device, such as when additional content is created and can be utilized for light sequence generation.

In addition to the above, one or more voice enabled devices may be utilized for the generation and/or acquisition of illumination data. For example, a user may provide a user utterance to the voice enabled device, which may generate audio data corresponding to the user utterance and send that audio data to a speech processing system. In examples, the user utterance may request that the connected device be configured to display a given light sequence, and/or to enable the connected device for synchronized light emission with given content, and/or to request the content. The speech processing system may receive the audio data from the voice enable device and utilize the audio data to determine the user request. When that request is associated with acquiring the illumination data, a speechlet configured to service the request may be called to retrieve the illumination data and provide the illumination data to the connected device. When the voice enabled device, or another electronic device associated with the voice enable device, is utilized to request output of the content, the system may determine whether a command should be sent to the connected device to cause the light sequence to be output by the connected device. By so doing, in examples, a user need only provide a voice command associated with the content to cause the content to be displayed and for the connected device to emit light corresponding to the light sequence.

Additionally, while illumination sequences are described herein as being generated for use by a device having a light array, other types of sequences for other types of applications are also included in this disclosure. For example, movement sequences may be generated for use by a device having moveable mechanisms, water fountains outputting water from jets, motors such as servo motors, and/or other devices where a sequence of output may be generated.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for content-based light illumination. The system 100 may include, for example, electronic devices, which may include communal devices, personal devices, and/or devices configured with sensors to detect environmental changes. In certain examples, at least some of the devices may be voice enabled devices 102 (e.g., Echo devices, mobile phones, tablets, personal computers, etc.), video interface devices 104 (e.g., televisions, set top boxes, virtual/augmented reality headsets, etc.), touch interface devices (tablets, phones, laptops, kiosks, billboard, etc.), and connected devices 106 (e.g., devices having a light array). These electronic devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The system 100 may also include one or more personal devices, which may be electronic devices, such as a mobile phone, tablet, laptop, wearable device, and/or other computing device that is specifically associated with a given user profile. The system 100 may also include one or more computing devices 108, which may be electronic devices configured to generate illumination data and/or to receive user input for the generation of illumination data. The devices may be configured to send data to and/or receive data from a remote system 110, such as via a network 112. Additionally, it should be understood that a given space and/or environment may include numerous devices. It should also be understood that when a "space" or "environment" is used herein, those terms mean an area and not necessarily a given room, building, or other structure, unless otherwise specifically described as such.

The voice enabled devices 102 and/or the video interface devices 104 may include one or more components, such as, for example, one or more processors 114, one or more network interfaces 116, memory 118, one or more microphones 120, one or more speakers 122, and/or one or more displays 124. The microphones 120 may be configured to capture audio, such as user utterances, and generate corresponding audio data. The speakers 122 may be configured to output audio, such as audio corresponding to audio data received from another device and/or the system 110. It should be understood that while several examples used herein include a voice enabled device 102 that allows users to interact therewith via user utterances, one or more other devices, which may not include a voice interface, may be utilized instead of or in addition to voice enabled devices 102. In these examples, the device may be configured to send and receive data over the network 112 and to communicate with other devices in the system 100. As such, in each instance where a voice enabled device 102 is utilized, a device that does not include a voice interface may also or alternatively be used. It should be understood that when voice enabled devices 102 are described herein, those voice enabled devices 102 may include phones, computers, and/or other computing devices.

The connected devices 106 may include one or more components, such as, for example, one or more processors 126, one or more network interfaces 128, and/or memory 130. The memory 130 may include components such as, for example, illumination data storage 132. As described above, the connected devices 106 may include devices that have a light array, which may include one or more lights. The light arrays associated with various connected devices may have a number of differences, such as the number of lights in the light array, the position of lights with respect to each other, distances between lights, light sizes, light capabilities, etc. The illumination data storage 132 may be configured to store illumination data, such as illumination data sent from the voice enabled device 102, the video interface device 104, the computing device 108, and/or the remote system 110. The illumination data may be utilized for causing the processors 126 of the connected device 106 to cause lights 134 of the device 106 to perform the light sequence.

The computing device 108 may include components such as, for example, one or more processors 136, one or more network interfaces 138, and/or memory 140. The memory 140 may include one or more components such as, for example, one or more user interfaces 142, a light configuration component 144, a content component 146, a visual representation component 148, an illumination sequence data generator 150, and/or a synchronization component 152. Each of these components will be described below by way of example.

For example, the user interfaces 142 may be generated and may be configured to perform operations associated with content-based light illuminations. For example, the user interfaces 142 may be utilized to receive user input for generating light illumination sequences and/or for displaying information for a user of the user interfaces 142 to utilize for generating light illumination sequences. The user interfaces 142 may be displayed on the computing device 108.

The light configuration component 144 may be configured to receive and/or determine configuration data indicating a configuration of a light array of a given connected device 106. As described herein, the light array of a given connected device 106 may include attributes that may vary amongst light arrays, such as the number of lights 134, the positioning of the lights 134, the distance(s) between lights 134, the capabilities of the lights 134, the sizes of the lights 134, the types of the lights 134, etc. The light configuration component 144 may be configured to receive information associated with these attributes for use by the computing device 108 for generating light illumination sequences. In examples, user input may be received, such as via the user interfaces 142, that indicates the light configuration. For example, a user may utilize the user interfaces 142 to provide user input indicating the number of lights 134 in the light array, light spacing, light capabilities, etc. In other examples, the light configuration component 144 may query the connected device 106 and/or a system associated with the connected device 106 for the light configuration data. For example, the connected device 106 and/or the associated system may store data indicating the light configuration and may provide that data to the light configuration component 144 in response to a request for such information. In still other examples, light configurations may be predetermined and stored in association with the computing device 108, and those light configurations may be associated with device types, light array types, etc. A user may utilize the user interfaces 142 to select a device type and/or a light array type, and the light configuration associated with that selection may be utilized as the light configuration for the connected device 106 at issue.

The visual representation component 148 may be configured to utilize the light configuration data to generate visual representation data of the lights 134 in the light array. A given visual representation may indicate some or all of the attributes of a given light array, such as the number of lights 134 in the light array, spacing and distances between lights 134, etc. For example, if a shirt connected device 106 has fourteen lights 134 on a front side of the device 106, with two lights 134 on each sleeve of the shirt and ten lights on the body portion of the shirt, the visual representation associated with that light array may indicate such an arrangement of lights 134. In examples, an outline or other indication of the connected device 106 itself may also be included in the visual representation. The visual representation component 148 may be configured to generate visual representation data representing the visual representation of a given light array, and to cause display of the visual representation on a screen of the computing device, such as via the user interfaces 142.

The content component 146 may be configured to retrieve content data for use in generating the light illumination data as described herein. For example, the content component 146 may be utilized to receive user input indicating a selection of content to be utilized. For example, the content data may include a movie or otherwise image data. The content component 146 may retrieve the content data from one or more databases, such as a content database associated with the computing device 108, with one or more other electronic devices 102, 104, and/or one or more remote systems, such as systems that allow for streaming content services. Images corresponding to the content data may be displayed on a content display portion of a user interface 142 for light illumination sequence generation. The user interface 142 may also include a progress bar indicating where currently-displayed images are at in association with the content as a whole. The visual representation of the light array may also be displayed in the content display portion of the user interface 142, such as in the form of an overlay on the images being displayed.

The user interface 142 may now include functionality that may allow a user to indicate what portion of the selected content is to be utilized for generating a light illumination sequence and the area of the images that is to be associated with each light representation in the visual representation of the light array. For example, utilizing a progress bar for example, user input may be received indicating which portion of the content is to be utilized for generating light illumination sequences. The user may slide a selection bar associated with the progress bar to indicate which portion of the content is to be utilized. The amount of the portion of the content may also be changed utilizing the selection bar, such that increasing the size of the selection bar may increase the portion of the content while decreasing the size of the selection bar may decrease the portion of the content. Additionally, the visual representation may be configured to be manipulated via user input to change which areas of the portion of the content are associated with each light representation. For example, each light representation may be moved about the content display portion of the user interface 142, allowing the user to select which area of the images being displayed is to be associated with a given light representation. Additionally, user input may be provided that indicates the size and/or shape of the area to be associated with each light representation. For example, a user may utilize the user interface 142 to change the size and/or shape of a given light representation, and in doing so may indicate the area to attribute to the light representation. It should be understood that each light representation may be associated with the same size and/or shape of area of the images, and/or some or all of the sizes and/or shapes may differ. In addition to the above, the user interface 142 may be utilized to add a light representation and/or to remove a light representation from the visual representation of the light array.

The user interface 142 may also include functionality to aid in testing light illumination sequences prior to generation of the light illumination data to be sent to the connected device 106 for use by the connected device 106. For example, the user interface 142 may include a preview illumination element, which, when selected, may cause the portion of the content to be output on the display portion of the user interface 142 as well as cause the visual representation to provide an indication of the light sequence that would be generated given the placement of the visual representation on the display portion of the user interface 142. By so doing, the user may utilize the light sequence preview to iterate how the light sequence is to be generated, such as by changing the position of one or more of the light representations, the size and/or shape of the area attributable to the light representations, the portion of the content being utilized, the duration of the content being utilized, etc.

Once the placement and/or configuration of the visual representation has been confirmed by the user, the computing device 108 may utilize the illumination sequence data generator 150 to generate illumination data for each light representation in the visual representation of the light array. To do so, the illumination sequence data generator 150 may determine, for some or all of the light representations, a color to attribute to the light representation per frame of the content data and/or per a set of frames. By so doing, the light illumination data may indicate, for each light representation, color changes to attribute to the corresponding light over a period of time corresponding to the portion of the content that was selected. The result may be that the light array is caused to emit lights that correspond to the color changes, which may be similar color changes occurring with respect to the content when played. In these examples, the light sequence may mimic or otherwise be associated with the content that is displayed.

To determine a color to attribute to a light representation for a given frame of the content and/or set of frames, the position of the light representation in the display portion of the user interface 142 as well as the size and/or shape of the area attributable to light representation may be utilized. The illumination sequence data generator 150 may determine, for each light representation, a color that is representative of the colors in the area attributable to the light representation. Determining the representative color may be based at least in part on a most common color in the area, an averaging of colors such as by assigning values to colors and determining an average of such values, determining which color is associated with the greatest portion of the area, etc. The illumination sequence data generator 150 may then determine which color to attribute to the light representation for the frame and/or set of frames at issue based at least in part on the representative color and, in examples, the capabilities associated with the light array. For example, some light arrays may be configured to display more colors and/or shades of colors than other light arrays. The illumination sequence data generator 150 may utilize data associated with the light capabilities to determine a color that is most similar to the representative color determined for the light representation. In some examples, the determined color may be the representative color, such as in situations where the capabilities of the light array allow for emission of light having the representative color. In other examples, the determined color may be a variant of the representative color, such as in situations where the capabilities of the light array do not allow for emission of light having the representative color. This process may be repeated, in whole or in part, for the other frames and/or sets of frames associated with the selected portion of the content and/or for each of the other light representations in the visual representation. The result of this process may be light illumination data indicating colors to be emitted from the light array and/or color transitions. This light illumination data may be packaged or otherwise formatted for sending to the connected device 106 having the light array. The connected device 106 may receive the formatted light illumination data and may store the light illumination data in the illumination data storage 132 of the connected device 106. The light illumination data may then be utilized to cause one or more processors 126 of the connected device 106 to perform operations, such as causing the lights 134 in the light array to emit light in the pattern indicated by the light illumination data.

In examples, the synchronization component 152 may be configured to synchronize the light sequence with the portion of the content utilized to generate the light illumination data. For example, a user may desire not just to generate a light illumination sequence that mimics or is otherwise associated with the portion of the content, but also to have the connected device 106 emit the animated light in synchronization with output of the content on an associated electronic device 104. For example, when the content is a movie, images corresponding to the movie may be output by a video interface device 104, such as a television. When the portion of the movie that was utilized to generate the illumination data, and/or that is otherwise indicated to be associated with the light sequence, is output by the video interface device 104, the connected device 106 may be caused to perform the light sequence such that output of light by the connected device 106 is synchronized with output of images of the movie. To do so, the synchronization component 152 may generate synchronization data indicating a start time for the portion of the content as well as time stamps associated with transitions of colors in the light sequence. The connected device 106 may utilize the synchronization data to determine when to initiate the light sequence and how long to cause a given light 134 in the light array to emit a given color and when to transition to the next color in the light sequence.

In examples where the light sequence is to be performed in synchronization with display of the content, synchronized output may be performed in one or more ways. For example, the connected device 106 and/or the video interface device 104 may be configured to determine whether the connected device 106 is enabled and/or is in a state indicating that the connected device 106 is ready to emit light corresponding to the light sequence. In examples, such an indication may be based at least in part on device beaconing between the devices, user input data, user account data indicating device configurations of devices associated with a user account, etc. The illumination data may be sent to the connected device 106 at one or more times. For example, the illumination data may be stored on the connected device 106 prior to acquisition by a user, during an out-of-the-box experience, in response to a user request for the illumination data, when the content is requested and/or acquired by the video interface device 104, as part of an update to the connected device 106, etc. By so doing, multiple light sequences may be stored and utilized by the connected device 106 over time and/or different light sequences may be stored on the connected device 106, such as when additional content is created and can be utilized for light sequence generation.

In addition to the above, the voice enabled device 102 may be utilized for the generation and/or acquisition of illumination data. For example, a user may provide a user utterance to the voice enabled device 102, which may generate audio data corresponding to the user utterance and send that audio data to a speech processing system 154 of the remote system 110. In examples, the user utterance may request that the connected device 106 be configured to display a given light sequence, and/or to enable the connected device 106 for synchronized light emission with given content, and/or to request the content. The speech processing system 154 may receive the audio data from the voice enable device 102 and utilize the audio data to determine the user request. When that request is associated with acquiring the illumination data, a speechlet configured to service the request may be called to retrieve the illumination data and provide the illumination data to the connected device 106. When the voice enabled device 102, or another electronic device associated with the voice enable device 102, is utilized to request output of the content, the remote system 110 may determine whether a command should be sent to the connected device 106 to cause the light sequence to be output by the connected device 106. By so doing, in examples, a user need only provide a voice command associated with the content to cause the content to be displayed and for the connected device 106 to emit light corresponding to the light sequence.

The remote system 110 may include components such as, for example, the speech-processing system 154, a user registry 156, a light configuration component 158, a content component 160, a visual representation component 162, an illumination sequence data generator 164, a synchronization component 166, and/or one or more user interface 168. It should be understood that while the speech-processing system 154 and the other components are depicted as separate from each other in FIG. 1, some or all of the components may be a part of the same system. The speech-processing system 154 may include an automatic speech recognition component (ASR) 170 and/or a natural language understanding component (NLU) 172. Each of the components described herein with respect to the remote system 110 may be associated with their own systems, which collectively may be referred to herein as the remote system 110, and/or some or all of the components may be associated with a single system. Additionally, the remote system 110 may include one or more applications, which may be described as skills. "Skills," as described herein may be applications and/or may be a subset of an application. For example, a skill may receive data representing an intent. For example, an intent may be determined by the NLU component 172 and/or as determined from user input via a computing device. Skills may be configured to utilize the intent to output data for input to a text-to-speech component, a link or other resource locator for audio data, and/or a command to a device, such as the voice enabled device 102.

In instances where a voice enabled device 102 is utilized, skills may extend the functionality of video interface devices 104 and/or connected devices 106 that can be controlled by users utilizing a voice-user interface. In some examples, skills may be a type of application that may be useable in association with connected devices 106 and may have been developed specifically to work in connection with given connected devices 106. Additionally, skills may be a type of application that may be useable in association with the voice enabled device 102 and may have been developed specifically to provide given functionality to the voice enabled device 102. In examples, a non-skill application may be an application that does not include the functionality of a skill. Speechlets, as described herein, may be a type of application that may be usable in association with voice enabled devices 102 and may have been developed specifically to work in connection with voice interfaces of voice enabled devices 102. The application(s) may be configured to cause processor(s) to receive information associated with interactions with the voice enabled device 102. The application(s) may also be utilized, in examples, to receive input, such as from a user of a personal device and/or the voice enabled device 102, and send data and/or instructions associated with the input to one or more other devices.

The components of the remote system 110 are described in detail herein. In examples, some or each of the components of the remote system 110 may include their own processor(s), network interface(s), and/or memory. As such, by way of example, the speech-processing system 154 may include and/or be associated with processor(s), network interface(s), and/or memory. The other components of the remote system 110, such as the illumination sequence data generator 164, may include and/or be associated with different processor(s), network interface(s), and/or memory, or one or more of these components may utilize some or all of the same processor(s), network interface(s), and/or memory utilized by the speech-processing system 154. These components are described in detail below. Additionally, the operations and/or functionalities associated with and/or described with respect to the components of the remote system 110 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 156 may be configured to determine and/or generate associations between users, user accounts, and/or devices. For example, one or more associations between user accounts may be identified, determined, and/or generated by the user registry 156. The user registry 156 may additionally store information indicating one or more applications and/or resources accessible to and/or enabled for a given user account. Additionally, the user registry 156 may include information indicating device identifiers, such as naming identifiers, associated with a given user account, as well as device types associated with the device identifiers. The user registry 156 may also include information indicating user account identifiers, naming indicators of devices associated with user accounts, and/or associations between devices, such as the voice enabled devices 102 and/or the video interface devices 104, and/or the connected devices 106. The user registry 156 may also include information associated with usage of the voice enabled devices 102 and/or the connected devices 106. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 154 may be configured to receive audio data from the voice enabled devices 102 and/or other devices and perform speech-processing operations. For example, the ASR component 170 may be configured to generate text data corresponding to the audio data, and the NLU component 172 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Light Show A on Device A," the NLU component 172 may identify a "play light sequence" intent and the payload may be "Light Show A on Device A." In this example where the intent data indicates an intent to cause a light illumination sequence on a connected device 106, the speech-processing system 154 may call one or more speechlets to effectuate the intent. Speechlets, as described herein may otherwise be described as applications and may include functionality for utilizing intent data to generate directives and/or instructions. For example, a connected-device speechlet may be called when the intent indicates that an action is to be performed in association with a connected device 106. The speechlet may be designated as being configured to handle the intent of generating and/or sending commands for operations of connected devices 106, for example. The speechlet may receive the intent data and/or other data associated with the user utterance from the NLU component 172, such as by an orchestrator of the remote system 110, and may perform operations to instruct the connected device 106 to perform an operation. The remote system 110 may generate audio data confirming that a given connected device 106 is to be operated, such as by a text-to-speech component. The audio data may be sent from the remote system 110 to the voice enabled device 102 for output of corresponding audio by the speakers 122 of the voice enabled device 102.

The light configuration component 158, the content component 160, the visual representation component 162, the illumination sequence data generator 164, the synchronization component 166, and/or the one or more user interface 168 of the remote system 110 may perform the same or similar functions as the corresponding one or more user interfaces 142, light configuration component 144, content component 146, visual representation component 148, illumination sequence data generator 150, and/or synchronization component 152 of the computing device 108.

It should be noted that while text data is described as a type of data utilized to communicate between various components of the remote system 110 and/or other systems and/or devices, the components of the remote system 110 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the remote system 110 and the associated functionality of those components as described herein may be performed by one or more of the devices 102, 104, 106, 108. Additionally, or alternatively, some or all of the components and/or functionalities associated with the devices 102, 104, 106, 108 may be performed by the remote system 110.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 114, 126, 136, and/or the processor(s) described with respect to the components of the remote system 110, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114, 126, 136, and/or the processor(s) described with respect to the components of the remote system 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114, 126, 136, and/or the processor(s) described with respect to the components of the remote system 110 may possess its own local memory, which also may store program components, program data, and/or one or more operating systems.

The memory 118, 130, 140, and/or the memory described with respect to the components of the remote system 110 may include volatile and nonvolatile memory, removable and non-removable media implemented in any method or technology for storage of information, such as computer-readable instructions, data structures, program component, or other data. Such memory 118, 130, 140, and/or the memory described with respect to the components of the remote system 110 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118, 130, 140, and/or the memory described with respect to the components of the remote system 110 may be implemented as computer-readable storage media ("CRSM"), which may be any available physical media accessible by the processor(s) 114, 126, 136, and/or the processor(s) described with respect to the remote system 110 to execute instructions stored on the memory 118, 130, 140, and/or the memory described with respect to the components of the remote system 110. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118, 130, 140, and/or the memory described with respect to the components of the remote system 110, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 116, 128, 138, and/or the network interface(s) described with respect to the components of the remote system 110 may enable messages between the components and/or devices shown in system 100 and/or with one or more other polling systems, as well as other networked devices. Such network interface(s) 116, 128, 138, and/or the network interface(s) described with respect to the components of the remote system 110 may include one or more network interface controllers (NICs) or other types of transceiver devices to send and receive messages over the network 106.

For instance, each of the network interface(s) 116, 128, 138, and/or the network interface(s) described with respect to the components of the remote system 110 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116, 128, 138, and/or the network interface(s) described with respect to the components of the remote system 110 may include a wide area network (WAN) component to enable message over a wide area network.

In some instances, the remote system 110 may be local to an environment associated the devices 102, 104, 106, 108.

For instance, the remote system 110 may be located within one or more of the devices 102, 104, 106, 108. In some instances, some or all of the functionality of the remote system 110 may be performed by one or more of the devices 102, 104, 106, 108. Also, while various components of the remote system 110 have been labeled and named in this disclosure and each component has been described as being configured to cause the processor(s) to perform certain operations, it should be understood that the described operations may be performed by some or all of the components and/or other components not specifically illustrated.

Figure 2:
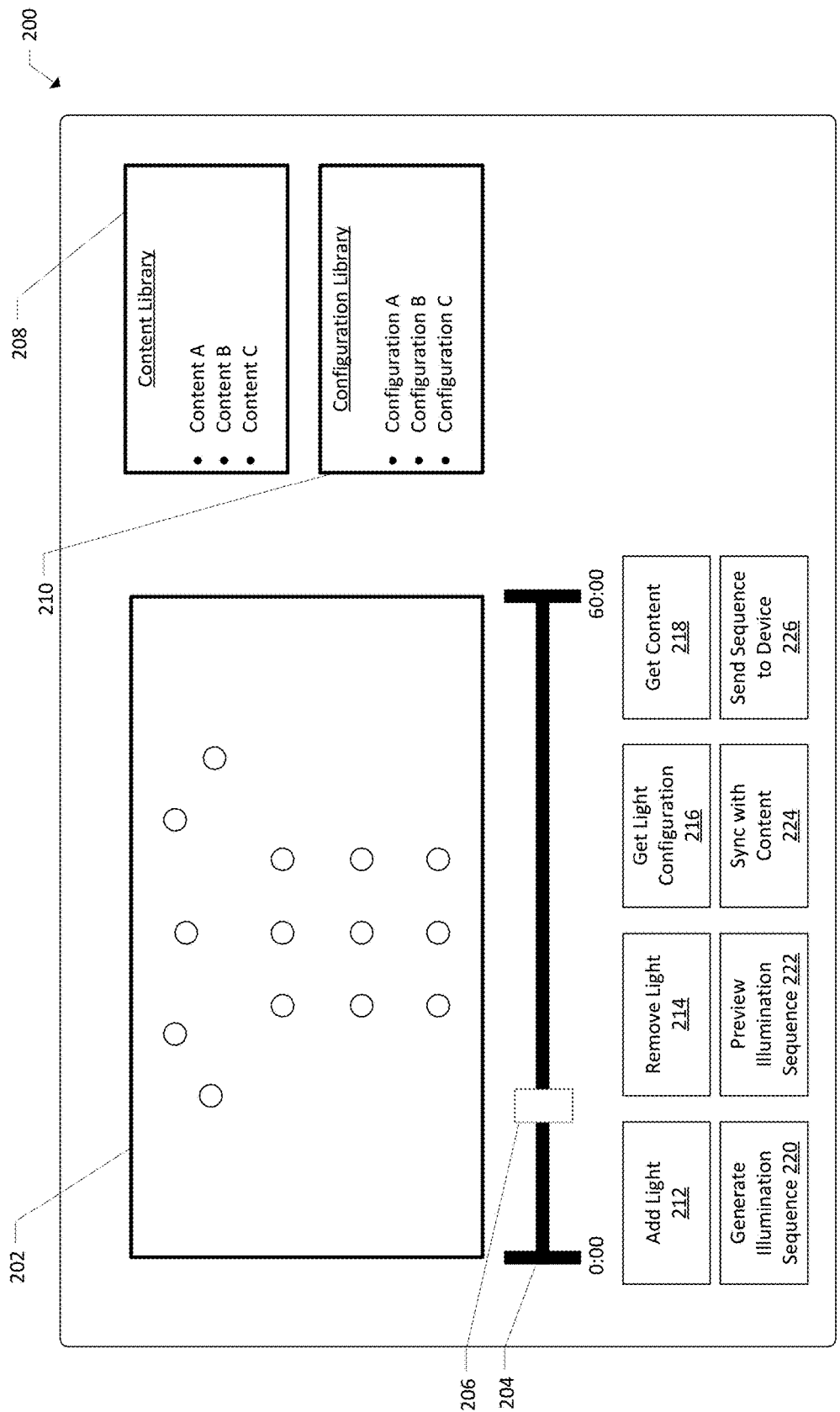
FIG. 2 illustrates a conceptual diagram of a user interface utilized in association with content-based light illumination.

FIG. 2 illustrates a conceptual diagram of a user interface 200 utilized in association with content-based light illumination. The user interface 200 may be the same as or similar to, and may include the same or similar functionality as, the user interfaces 142 described with respect to FIG. 1. The user interface 200 may include one or more components, such as a display window 202, a progress 204, a selection bar 206, a content library 208, a configuration library 210, an add-light element 212, a remove-light element 214, a get-light-configuration element 216, a get-content element 218, a generate-illumination element 220, a preview-illumination element 222, a synchronization element 224, and/or a send-illumination element 226. These components of the user interface 200 will be described in more detail below.

The user interface 200 may be generated and may be configured to perform operations associated with content-based light illuminations. For example, the user interface 200 may be utilized to receive user input for generating light illumination sequences and/or for displaying information for a user of the user interface 200 to utilize for generating light illumination sequences.

The get-light-configuration element 216 may be utilized to receive and/or determine a configuration of a light array associated with a connected device. For example, the light array of a given connected device may include attributes that may vary amongst light arrays, such as the number of lights, the positioning of the lights, the distance(s) between lights, the capabilities of the lights, the sizes of the lights, the types of the lights, etc. The get-light-configuration element 216 may be utilized to receive information associated with these attributes for use by a computing device for generating light illumination sequences. For example, the add-light element 212 may be utilized to add light representations to the display window 202. The light representations may be moveable about the display window 202 to mimic the configuration of the given light array. In other examples, when the get-light-configuration element 216 is selected, a light configuration component may query the connected device with the light array and/or a remote system associated with the connected device for the light configuration data. For example, the connected device and/or the associated remote system may store data indicating the light configuration and may provide that data to the light configuration component in response to a request for such information. In still other examples, light configurations may be predetermined and stored in association with the user interface 200, and those light configurations may be associated with device types, light array types, etc. For example, the configuration library 210 may provide indications of stored light configurations. A user may utilize the configuration library 210 to select a device type and/or a light array type, and the light configuration associated with that selection may be utilized as the light configuration for the connected device at issue.

Additionally, the content library 208 may be utilized to retrieve content data for use in generating the light illumination data as described herein. For example, the content library 208 may be utilized to receive user input indicating a selection of content to be utilized. For example, the content data may include a movie or otherwise image data. The content component may retrieve the content data from one or more databases, such as a content database associated with the computing device, with one or more other electronic devices, and/or one or more remote systems, such as systems that allow for streaming content services. Images corresponding to the content data may be displayed on a display window 202. The progress bar 204 may indicate where currently-displayed images are at in association with the content as a whole. The visual representation of the light array may also be displayed in the display window 202, such as in the form of an overlay on the images being displayed.

The user interface 200 may include functionality that may allow a user to indicate what portion of the selected content is to be utilized for generating a light illumination sequence and the area of the images that is to be associated with each light representation in the visual representation of the light array. For example, utilizing the progress bar 204 for example, user input may be received indicating which portion of the content is to be utilized for generating light illumination sequences. The user may slide the selection bar 206 associated with the progress bar 204 to indicate which portion of the content is to be utilized. The amount of the portion of the content may also be changed utilizing the selection bar 206, such that increasing the size of the selection bar 206 may increase the portion of the content while decreasing the size of the selection bar 206 may decrease the portion of the content. Additionally, the visual representation may be configured to be manipulated via user input to change which areas of the portion of the content are associated with each light representation. For example, each light representation may be moved about the display window 202, allowing the user to select which area of the images being displayed is to be associated with a given light representation. Additionally, user input may be provided that indicates the size and/or shape of the area to be associated with each light representation. For example, a user may utilize the user interface 200 to change the size and/or shape of a given light representation, and in doing so may indicate the area to attribute to the light representation. It should be understood that each light representation may be associated with the same size and/or shape of area of the images to be attributed to each light representation, and/or some or all of the sizes and/or shapes may differ. In addition to the above, the user interface 200 may be utilized to add a light representation using the add-light element 212 and/or to remove a light representation using the remove-light element 214.

The user interface 200 may also include functionality to aid in testing light illumination sequences prior to generation of the light illumination data to be sent to the connected device for use by the connected device. For example, the preview-illumination element 222, which, when selected, may cause the portion of the content to be output on the display window 202 as well as cause the visual representation to provide an indication of the light sequence that would be generated given the placement of the visual representation on the display window 202. By so doing, the user may utilize the preview-illumination element 222 to iterate how the light sequence is to be generated, such as by changing the position of one or more of the light representations, the size and/or shape of the area attributable to the light representations, the portion of the content being utilized, the duration of the content being utilized, etc.

Once the placement and/or configuration of the visual representation has been confirmed by the user, the generate-illumination element 220 may be selected to cause an illumination sequence data generator to generate illumination data for each light representation in the visual representation of the light array. To do so, the illumination sequence data generator may determine, for some or all of the light representations, a color to attribute to the light representation per frame of the content data and/or per a set of frames. By so doing, the light illumination data may indicate, for each light representation, color changes to attribute to the corresponding light over a period of time corresponding to the portion of the content that was selected. The result may be that the light array is caused to emit lights that correspond to the color changes, which may be similar color changes occurring with respect to the content when played. In these examples, the light sequence may mimic or otherwise be associated with the content that is displayed.

Once the light illumination data is generated, the send-illumination element 226 may be selected, which may cause the computing device to send the illumination data to the connected device. For example, the light illumination data may be packaged or otherwise formatted for sending to the connected device having the light array. The connected device may receive the formatted light illumination data and may store the light illumination data in an illumination data storage of the connected device. The light illumination data may then be utilized to cause one or more processors of the connected device to perform operations, such as causing the lights in the light array to emit light in the pattern indicated by the light illumination data. Additionally, a user may provide user input indicating which device to send the illumination data to. For example, the illumination sequence may be useable by more than one device, and in these examples the user interface 200 may provide functionality to allow a user to select which device to send the illumination data to.

In examples, such as when the synchronization element 224 is selected, a synchronization component may be configured to synchronize the light sequence with the portion of the content utilized to generate the light illumination data. For example, a user may desire not just to generate a light illumination sequence that mimics or is otherwise associated with the portion of the content, but also to have the connected device emit the animated light in synchronization with the output of the content on an associated electronic device. For example, when the content is a movie, images corresponding to the movie may be output by an electronic device, such as a television. When the portion of the movie that was utilized to generate the illumination data, and/or that is otherwise indicated to be associated with the light sequence, is output by the television, the connected device may be caused to perform the light sequence such that output of light by the connected device is synchronized with output of images of the movie. To do so, the synchronization component may generate synchronization data indicating a start time for the portion of the content as well as time stamps associated with transitions of colors in the light sequence. The connected device may utilize the synchronization data to determine when to initiate the light sequence and how long to cause a given light in the light array to emit a given color and when to transition to the next color in the light sequence. It should be understood that one or more protocols may be utilized to send data to and from the connected devices described herein. Those protocols may include Bluetooth, Bluetooth Low Energy, WiFi, Zigbee, etc.

Figure 3:
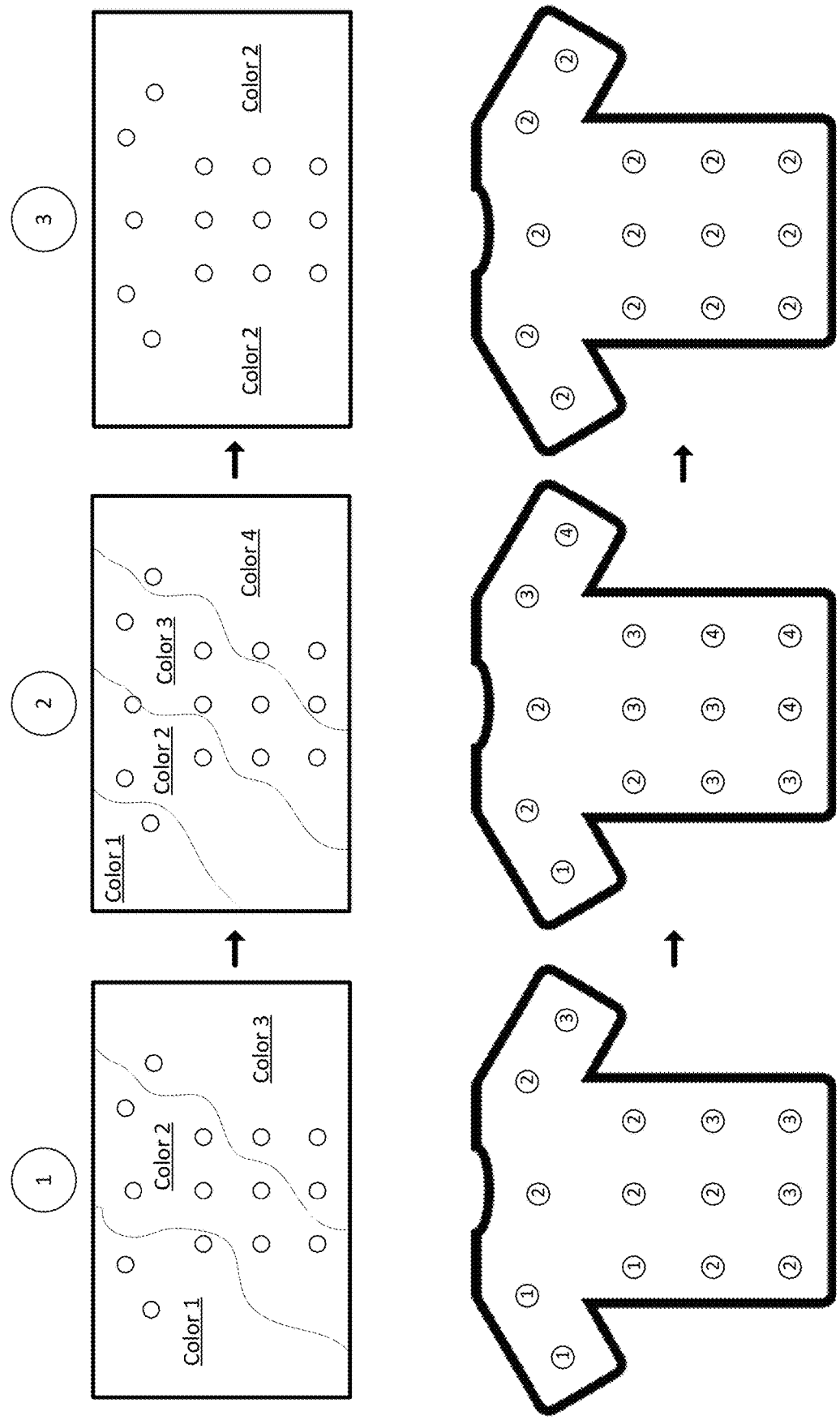
FIG. 3 illustrates a conceptual diagram of an example process for content-based light illumination determined from example image data.

FIG. 3 illustrates a conceptual diagram of an example process for content-based light illumination determined from example image data. FIG. 3 shows a progression from left to right, visualized as steps 1-3, of how content is displayed over time, whether on a computing device being utilized to generate lighting light sequences and/or a video interface device displaying content, and a connected device outputting a light illumination sequence during the same period of time. In other examples, the user interfaces indicate the progression of content being displayed while the connected device, depicted as a shirt in FIG. 3, indicates the light sequence being output by a light array of the connected device.

At shown in step 1, the content being displayed, such as on a display window of a user interface, may include one or more colors. In the example of the image associated with step 1 of FIG. 3, the image includes three colors: Color 1; Color 2; and Color 3. As can be seen, Color 1 is associated with a first portion of the display window, Color 2 is associated with a second portion of the display window, and Color 3 is associated with a third portion of the display window. It should be understood that while the colors and portions described in FIG. 3 are single colors, each portion of the display window may include multiple colors and the color being discussed may include a color that represents the primary and/or main color in the portion of the display window. Step 1 of FIG. 3 shows that each light representation in a visual representation of a light array may be assigned a color, and the color to be assigned may correspond to the color associated with the corresponding portion of the display window. For example, three of the light representations that are associated with the first portion of the display window may be associated with Color 1, and the corresponding lights of the connected device may emit Color 1 light. Additionally, seven of the light representations that are associated with the second portion of the display window may be associated with Color 2, and the corresponding lights of the connected device may emit Color 2 light. Additionally, four of the light representations that are associated with the third portion of the display window may be associated with Color 3, and the corresponding lights of the connected device may emit Color 3 light.

At step 2, a subsequent image of the content data may be displayed and that subsequent image may include the same or different colors than the image shown in step 1. For this image, and/or frame and/or set of frames, colors corresponding to those of the image may be utilized for determining which colors should be output by the light array. For example, some of the light representations that were associated with Color 1 may now be associated with Color 2, some of the light representations that were associated with Color 2 may now be associated with Color 3, and some of the light representations that were associated with Color 3 may now be associated with Color 4, as shown in step 2 of FIG. 3. The connected device may cause the light array to output corresponding light based at least in part on the illumination data sent to the connected device.

At step 3, yet another image of the content data may be displayed and that other image may include different colors and/or colors in different locations with respect to the display window. For this image, and/or frame and/or set of frames, colors corresponding to those of the image may be utilized for determining which colors should be output by the light array. For example, as shown in step 3, the entirety of the display window is shown to be associated with Color 2. In this example, all of the light representations may be associated with Color 2.

It should also be understood that while the example of FIG. 3 illustrates a single illumination sequence, the illumination sequence may be caused to repeat, such as when requested, and/or the sequence may be altered in one or more ways, such as by playing in reverse and/or by playing a portion of the sequence.

Figure 4A:
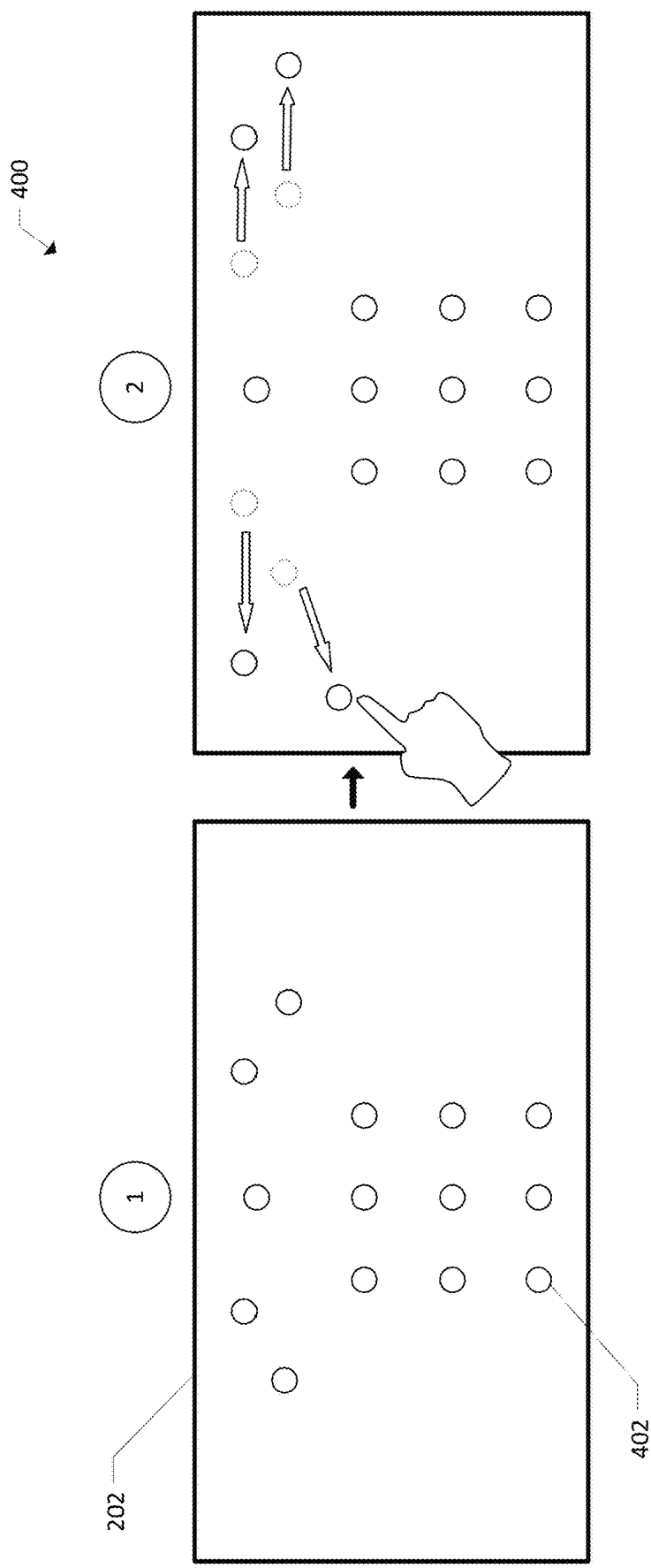
FIG. 4A illustrates a conceptual diagram of the use of a user interface to alter the positioning of visual representations of lights with respect to image data for content-based light illumination.

FIG. 4A illustrates a conceptual diagram of the use of a user interface 400 to alter the positioning of visual representations of lights with respect to image data for content-based light illumination. The user interface 400 may include a display window 202, which may be the same as or similar to the display window 202 described with respect to FIG. 2. FIG. 4A shows a progression from left to right, visualized as steps 1-2, of how a light representation may change position based at least in part on user input.

A visual representation of a light array may be presented on the display window 202, and some or all of the light representations 402 may be selectable and configurable. In FIG. 4A, the light representations 402 may be selectable to change the positioning of the light representations 402 with respect to each other and/or with respect to the display window 202. For example, as shown in step 1, the visual representation may include a number of light representations 402. The position of the light representations 402 in step 1 may be based at least in part on a user adding the light representations 402 to the display window 202 and/or based at least in part on configuration data received from a connected device and/or a system associated with a connected device.

At step 2, user input may be received at the display window 202, for example, indicating that at least one of the light representations 402 is to be moved from one location to another location on the display window 202. For example, as shown at step 2, four of the light representations 402 have been moved from their original locations shown in step 1 to new locations. It should be understood that some or all of the light representations 402 may be moveable, such as via user input.

Figure 4B:
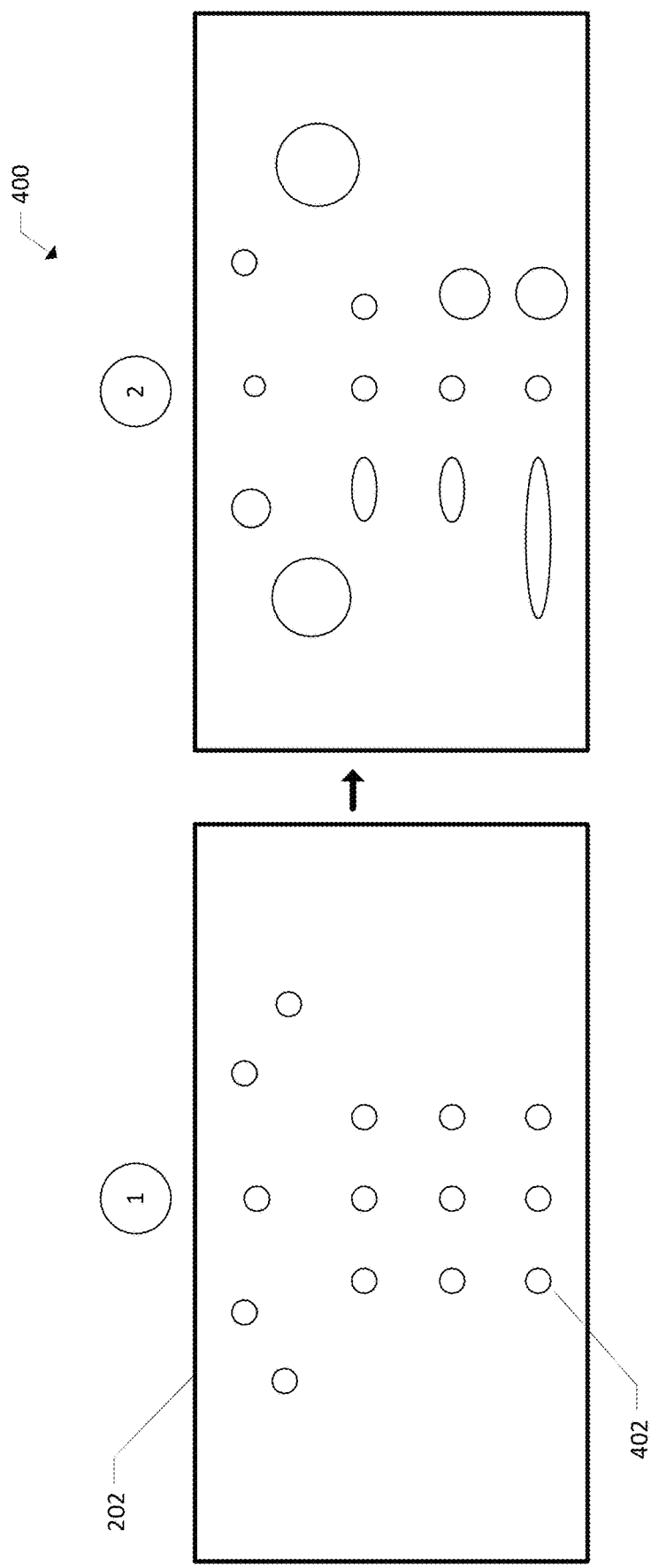
FIG. 4B illustrates a conceptual diagram of the use of a user interface to alter the area attributable to visual representations of lights with respect to image data for content-based light illumination.

FIG. 4B illustrates a conceptual diagram of the use of a user interface to alter the area attributable to visual representations of lights with respect to image data for content-based light illumination. The user interface 400 may include a display window 202, which may be the same as or similar to the display window 202 described with respect to FIG. 2. FIG. 4B shows a progression from left to right, visualized as steps 1-2, of how area of the display window 202 attributable to a light representation may change based at least in part on user input.

A visual representation of a light array may be presented on the display window 202, and some or all of the light representations 402 may be selectable and configurable. In FIG. 4B, the light representations 402 may be selectable to change the area of the display window 202 attributable to the light representations 402. For example, as shown in step 1, the visual representation may include a number of light representations 402. The position and/or area associated with the light representations 402 in step 1 may be based at least in part on a user adding the light representations 402 to the display window 202 and/or based at least in part on configuration data received from a connected device and/or a system associated with a connected device.

At step 2, user input may be received at the display window 202, for example, indicating that the area of the display window 202 associated with given light representations 402 is to be altered, such as in size and/or shape. For example, as shown at step 2, the shape and/or size of many of the light representations 402 has been changed from the shape and/or size of those light representations 402 as shown in step 1. Some of the light representations 402 have increased in size but have maintained a circular shape. Some of the light representations 402 have decreased in size but have maintained a circular shape. Some of the light representations 402 have changed shape, such as being oval shaped, and some of those light representations 402 are larger or smaller than other light representations 402. It should be understood that the shape of some or all of the light representations 402 may be circular or oval as shown in FIG. 4B, and/or the shape of the light representations 402 may include a shape that is not specifically shown in FIG. 4B, such as a square, rectangle, triangle, etc.

In addition to the above, the user interface may also user input that defines a shape of a give light representation, such as by a free form input of the shape. Additionally, the image displayed in the display window 202 may be scaled up, scaled down, and/or cropped to assist the user in associating a desired area of the image with the light representations.

Figure 5:
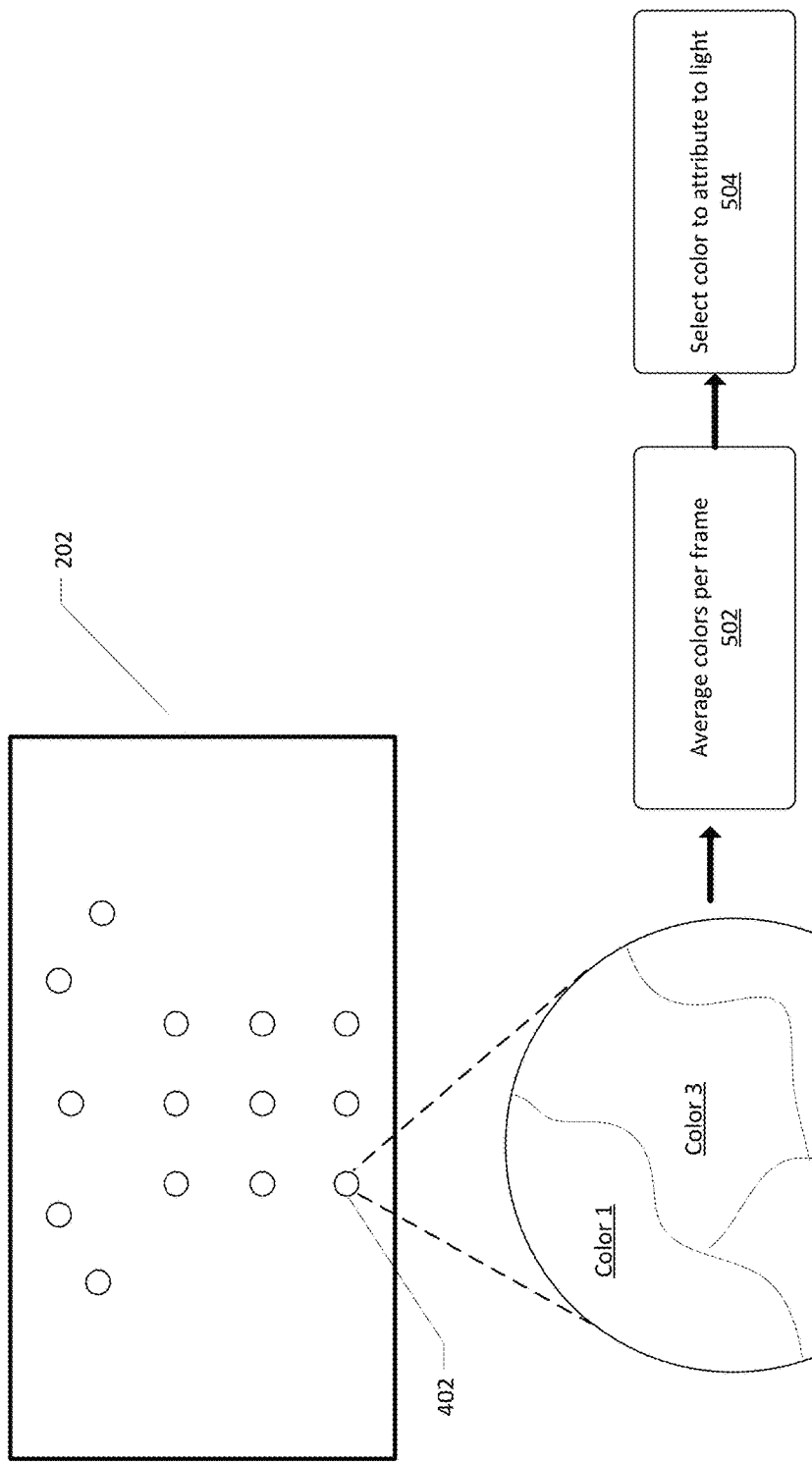
FIG. 5 illustrates a conceptual diagram of a process for determining a color to attribute to a light in a light array.

FIG. 5 illustrates a conceptual diagram of a process for determining a color to attribute to a light in a light array. As shown in FIG. 5, a user interface may be utilized to present a visual representation of a light array on a display window 202. The visual representation may include light representations 402 of the individual lights of the light array.

For the area associated with the individual light representations 402, one or more colors of one or more images displayed in the display window 202 may be present. A shown in FIG. 5, the highlighted, example light representation 402 is associated with, for a given frame and/or set of frames, four colors, namely Color 1, Color 2, Color 3, and Color 4. Each of these colors is associated with a certain amount and/or size of the light representation 402 and/or each of these colors is associated with a certain number of pixels and/or other units of area of the light representation 402. To determine which color to attribute to the light representation 402 for the frame and/or set of frames at issue, one or more techniques may be utilized. In still other examples, hex values may be utilized to assist in determining which color(s) to associate with the light representations. In these examples, the hex values may be shifted and/or determined based on the light capabilities data for the device. In this way, the hex values may be altered prior to determining the colors to associate with the light representations. In other examples, the representation colors may not be altered, but the selected color for a light representation may be altered. The resulting illumination sequence may be previewed on the user interface, may be sent as a preview to the device at issue, and/or a single frame or set of frames of the sequence may be previewed and/or sent to the device for previewing.

For example, at block 502, one or more components may determine the representative color of the light representation 402 based at least in part on a most common color in the area, an averaging of colors such as by assigning a value to colors and determining an average of such values, determining which color is associated with the greatest portion of the area, etc. For example, as shown in FIG. 5, Color 1, Color 3, and Color 4 each make up more of the area associated with the light representation 402 than Color 2. In some examples, the color with the most area may be selected as the representative color. In the example of FIG. 5 that color may be Color 3. In other examples, the colors may be averaged to determine the representative color. For example, each of the colors may be different shades of a given color, such as blue. In this example, values may be assigned to colors and those values may be averaged or otherwise analyzed to determine an average color for the light representation 402. In certain examples, more than one color may be determined as the representative color for a light representation 402. This may occur particularly where each light of the light array is capable of producing more than one light at a time, such as when each light represents a cluster of lights, such as light emitting diodes.

At block 504, an illumination sequence data generator may determine which color to attribute to the light representation for the frame and/or set of frames at issue based at least in part on the representative color and, in examples, the capabilities associated with the light array. For example, some light arrays may be configured to display more colors and/or shades of colors than other light arrays. The illumination sequence data generator may utilize data associated with the light capabilities to determine a color that is most similar to the representative color determined for the light representation 402. In some examples, the determined color may be the representative color, such as in situations where the capabilities of the light array allow for emission of light having the representative color. In other examples, the determined color may be a variant of the representative color, such as in situations where the capabilities of the light array do not allow for emission of light having the representative color. This process may be repeated, in whole or in part, for the other frames and/or sets of frames associated with the selected portion of the content and/or for each of the other light representations 402 in the visual representation. The result of this process may be light illumination data indicating colors to be emitted from the light array and/or color transitions. This light illumination data may be packaged or otherwise formatted for sending to the connected device having the light array. The connected device may receive the formatted light illumination data and may store the light illumination data in an illumination data storage of the connected device. The light illumination data may then be utilized to cause one or more processors of the connected device to perform operations, such as causing the lights in the light array to emit light in the pattern indicated by the light illumination data.

Figure 6:
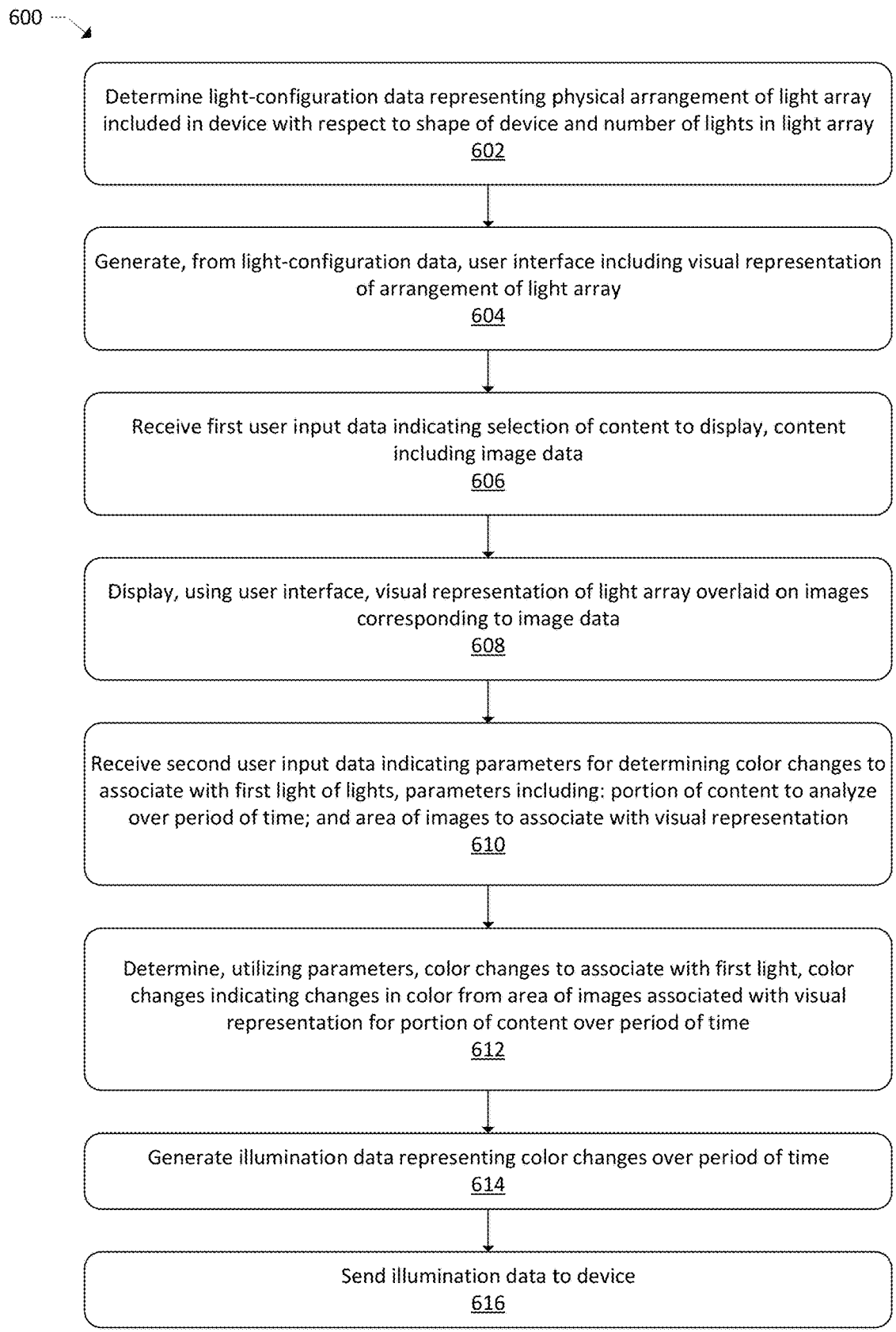
FIG. 6 illustrates a flow diagram of an example process for content-based light illumination.
Figure 7:
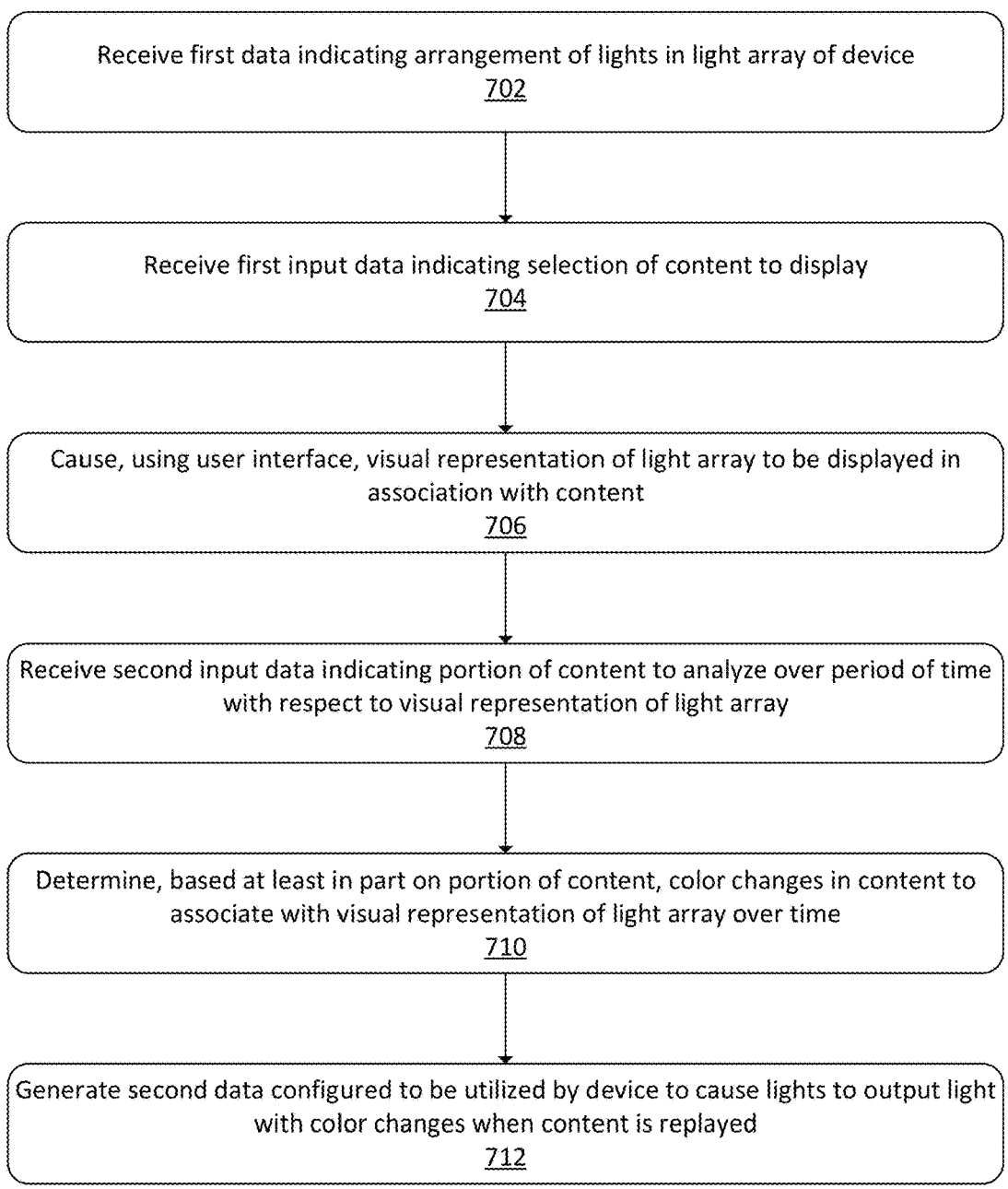
FIG. 7 illustrates a flow diagram of another example process for content-based light illumination.

FIGS. 6 and 7 illustrate processes for content-based light illuminations. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 8-11, although the processes may be implemented in a wide variety of other environments, architectures and systems.

FIG. 6 illustrates a flow diagram of an example process 600 for content-based light illumination. The order in which the operations or steps are described is not intended to be construed as a limitation, and any number of the described operations may be combined in any order and/or in parallel to implement process 600.

At block 602, the process 600 may include determining light-configuration data representing the physical arrangement of a light array included in a device with respect to a shape of the device and a number of lights in the light array. For example, a light configuration component may be configured to receive and/or determine configuration data indicating a configuration of a light array of a given connected device. As described herein, the light array of a given connected device may include attributes that may vary amongst light arrays, such as the number of lights, the positioning of the lights, the distance(s) between lights, the capabilities of the lights, the sizes of the lights, the types of the lights, etc. The light configuration component may be configured to receive information associated with these attributes for use by a computing device for generating light illumination sequences. In examples, user input may be received, such as via user interfaces, that indicates the light configuration. For example, a user may utilize the user interfaces to provide user input indicating the number of lights in the light array, light spacing, light capabilities, etc. In other examples, the light configuration component may query the connected device and/or a system associated with the connected device for the light configuration data. For example, the connected device and/or the associated system may store data indicating the light configuration and may provide that data to the light configuration component in response to a request for such information. In still other examples, light configurations may be predetermined and stored in association with the computing device, and those light configurations may be associated with device types, light array types, etc. A user may utilize the user interfaces to select a device type and/or a light array type, and the light configuration associated with that selection may be utilized as the light configuration for the connected device at issue.

At block 604, the process 600 may include generating, from the light-configuration data, a user interface including a visual representation of the arrangement of the light array. For example, a visual representation component may be configured to utilize the light configuration data to generate visual representation data of the lights in the light array. A given visual representation may indicate some or all of the attributes of a given light array, such as the number of lights in the light array, spacing and distances between lights, etc. For example, if a shirt connected device has fourteen lights on a front side of the device, with two lights on each sleeve of the shirt and ten lights on the body portion of the shirt, the visual representation associated with that light array may indicate such an arrangement of lights. In examples, an outline or other indication of the connected device itself may also be included in the visual representation. The visual representation component may be configured to generate visual representation data representing the visual representation of a given light array, and to cause display of the visual representation on a screen of the computing device, such as via the user interfaces.

At block 606, the process 600 may include receiving first user input data indicating selection of content to display, the content including image data. For example, a content component may be configured to retrieve content data for use in generating the light illumination data as described herein. For example, the content component may be utilized to receive user input indicating a selection of content to be utilized. For example, the content data may include a movie or otherwise image data. The content component may retrieve the content data from one or more databases, such as a content database associated with the computing device 108, with one or more other electronic devices, and/or one or more remote systems, such as systems that allow for streaming content services. Images corresponding to the content data may be displayed on a content display portion of a user interface for light illumination sequence generation. The user interface may also include a progress bar indicating where currently-displayed images are at in association with the content as a whole. The visual representation of the light array may also be displayed in the content display portion of the user interface, such as in the form of an overlay on the images being displayed.

At block 608, the process 600 may include displaying, using the user interface, the visual representation of the light array overlaid on images corresponding to the image data. For example, the visual representation may be caused to be displayed on a display window of the user interface while one or more of the images corresponding to the image data is displayed on the display window. By so doing, a user may be able to visualize which portions of the visual representation correspond to which portions of the images being displayed.

At block 610, the process 600 may include receiving second user input data indicating parameters for determining color changes to associate with a first light of the lights, the parameters including: a portion of the content to analyze over a period of time; and an area of the images to associate with the visual representation. For example, light representations of the visual representation may be selectable and configurable, allowing for a user to change the position of a given light representation and/or change an area of the display window attributable to the given light representation. Other parameters may include the addition and/or removal of light representations, information associated with the capabilities of the light representations, etc.

At block 612, the process 600 may include determining, utilizing the parameters, the color changes to associate with the first light, the color changes indicating changes in color from the area of the images associated with the visual representation for the portion of the content over the period of time. For example, once the placement and/or configuration of the visual representation has been confirmed by the user, the computing device may utilize an illumination sequence data generator to generate illumination data for each light representation in the visual representation of the light array. To do so, the illumination sequence data generator 150 may determine, for some or all of the light representations, a color to attribute to the light representation per frame of the content data and/or per a set of frames. By so doing, the light illumination data may indicate, for each light representation, color changes to attribute to the corresponding light over a period of time corresponding to the portion of the content that was selected. The result may be that the light array is caused to emit lights that correspond to the color changes, which may be similar color changes occurring with respect to the content when played. In these examples, the light sequence may mimic or otherwise be associated with the content that is displayed.

At block 614, the process 600 may include generating illumination data representing the color changes over the period of time. For example, to determine a color to attribute to a light representation for a given frame of the content and/or set of frames, the position of the light representation in the display portion of the user interface as well as the size and/or shape of the area attributable to light representation may be utilized. The illumination sequence data generator may determine, for each light representation, a color that is representative of the colors in the area attributable to the light representation. Determining the representative color may be based at least in part on a most common color in the area, an averaging of colors such as by assigning values to colors and determining an average of such values, determining which color is associated with the greatest portion of the area, etc. The illumination sequence data generator may then determine which color to attribute to the light representation for the frame and/or set of frames at issue based at least in part on the representative color and, in examples, the capabilities associated with the light array. For example, some light arrays may be configured to display more colors and/or shades of colors than other light arrays. The illumination sequence data generator may utilize data associated with the light capabilities to determine a color that is most similar to the representative color determined for the light representation. In some examples, the determined color may be the representative color, such as in situations where the capabilities of the light array allow for emission of light having the representative color. In other examples, the determined color may be a variant of the representative color, such as in situations where the capabilities of the light array do not allow for emission of light having the representative color. This process may be repeated, in whole or in part, for the other frames and/or sets of frames associated with the selected portion of the content and/or for each of the other light representations in the visual representation. The result of this process may be light illumination data indicating colors to be emitted from the light array and/or color transitions.

At block 616, the process 600 may include sending the illumination data to the device. For example, the light illumination data may be packaged or otherwise formatted for sending to the connected device having the light array. The connected device may receive the formatted light illumination data and may store the light illumination data in illumination data storage of the connected device. The light illumination data may then be utilized to cause one or more processors of the connected device 106 to perform operations, such as causing the lights in the light array to emit light in the pattern indicated by the light illumination data.

Additionally, or alternatively, the process 600 may include receiving first data indicating a device type of the device. The process 600 may also include determining, from the device type, a reference number of lights associated with the device type. The process 600 may also include determining, from the device type, a reference shape associated with the device type. The process 600 may also include displaying, using the user interface, the reference number and the reference shape associated with the device type. In these examples, determining the data indicating the light configuration may include receiving third user input data confirming that: the number of the lights corresponds to the reference number of the lights; and the shape corresponds to the reference shape.

Additionally, or alternatively, the process 600 may include receiving light-capability data associated with the lights, the light-capability data indicating a set of light colors that the lights are configured to emit. The process 600 may also include determining, for the first light of the lights, a first color representative of the area associated with the first light. The process 600 may also include determining a second color of the set of light colors that is similar to the first color. In these examples, determining the color changes to associate with the first light may include selecting the second color to associate with the first light.

Additionally, or alternatively, the process 600 may include determining timestamp data associated with the portion of the content, the timestamp data indicating a starting time for when the portion of the content is displayed. The process 600 may also include generating a command associating the timestamp data with the illumination data. The process 600 may also include sending, to the device, the command to cause the lights to initiate output of the color changes at the starting time while the portion of the content is being displayed on an image-output device.

FIG. 7 illustrates a flow diagram of another example process 700 for content-based light illumination. The order in which the operations or steps are described is not intended to be construed as a limitation, and any number of the described operations may be combined in any order and/or in parallel to implement process 700.

At block 702, the process 700 may include receiving first data indicating an arrangement of lights in a light array of a device. For example, a light configuration component may be configured to receive and/or determine configuration data indicating a configuration of a light array of a given connected device. As described herein, the light array of a given connected device may include attributes that may vary amongst light arrays, such as the number of lights, the positioning of the lights, the distance(s) between lights, the capabilities of the lights, the sizes of the lights, the types of the lights, etc. The light configuration component may be configured to receive information associated with these attributes for use by a computing device for generating light illumination sequences. In examples, user input may be received, such as via user interfaces, that indicates the light configuration. For example, a user may utilize the user interfaces to provide user input indicating the number of lights in the light array, light spacing, light capabilities, etc. In other examples, the light configuration component may query the connected device and/or a system associated with the connected device for the light configuration data. For example, the connected device and/or the associated system may store data indicating the light configuration and may provide that data to the light configuration component in response to a request for such information. In still other examples, light configurations may be predetermined and stored in association with the computing device, and those light configurations may be associated with device types, light array types, etc. A user may utilize the user interfaces to select a device type and/or a light array type, and the light configuration associated with that selection may be utilized as the light configuration for the connected device at issue.

At block 704, the process 700 may include receiving first input data indicating selection of content to display. For example, a content component may be configured to retrieve content data for use in generating the light illumination data as described herein. For example, the content component may be utilized to receive user input indicating a selection of content to be utilized. For example, the content data may include a movie or otherwise image data. The content component may retrieve the content data from one or more databases, such as a content database associated with the computing device 108, with one or more other electronic devices, and/or one or more remote systems, such as systems that allow for streaming content services. Images corresponding to the content data may be displayed on a content display portion of a user interface for light illumination sequence generation. The user interface may also include a progress bar indicating where currently-displayed images are at in association with the content as a whole. The visual representation of the light array may also be displayed in the content display portion of the user interface, such as in the form of an overlay on the images being displayed.

At block 706, the process 700 may include causing, using a user interface, a visual representation of the light array to be displayed in association with the content. For example, a visual representation component may be configured to utilize the light configuration data to generate visual representation data of the lights in the light array. A given visual representation may indicate some or all of the attributes of a given light array, such as the number of lights in the light array, spacing and distances between lights, etc. For example, if a shirt connected device has fourteen lights on a front side of the device, with two lights on each sleeve of the shirt and ten lights on the body portion of the shirt, the visual representation associated with that light array may indicate such an arrangement of lights. In examples, an outline or other indication of the connected device itself may also be included in the visual representation. The visual representation component may be configured to generate visual representation data representing the visual representation of a given light array, and to cause display of the visual representation on a screen of the computing device, such as via the user interfaces.

At block 708, the process 700 may include receiving second input data indicating a portion of the content to analyze over a period of time with respect to the visual representation of the light array. For example, the user may utilize a progress bar of the user interface to indicate how much of the content is to be utilized for light illumination sequences. Additionally, the user interface may allow the user to provide input indicating an area of the display window to attribute to each of the light representations of the visual representation.

At block 710, the process 700 may include determining, based at least in part on the portion of the content, color changes in the content to associate with the visual representation of the light array over time. For example, once the placement and/or configuration of the visual representation has been confirmed by the user, the computing device may utilize an illumination sequence data generator to generate illumination data for each light representation in the visual representation of the light array. To do so, the illumination sequence data generator 150 may determine, for some or all of the light representations, a color to attribute to the light representation per frame of the content data and/or per a set of frames. By so doing, the light illumination data may indicate, for each light representation, color changes to attribute to the corresponding light over a period of time corresponding to the portion of the content that was selected. The result may be that the light array is caused to emit lights that correspond to the color changes, which may be similar color changes occurring with respect to the content when played. In these examples, the light sequence may mimic or otherwise be associated with the content that is displayed.

At block 712, the process 700 may include generating second data configured to be utilized by the device to cause the lights to output light with the color changes when the content is replayed. For example, to determine a color to attribute to a light representation for a given frame of the content and/or set of frames, the position of the light representation in the display portion of the user interface as well as the size and/or shape of the area attributable to light representation may be utilized. The illumination sequence data generator may determine, for each light representation, a color that is representative of the colors in the area attributable to the light representation. Determining the representative color may be based at least in part on a most common color in the area, an averaging of colors such as by assigning values to colors and determining an average of such values, determining which color is associated with the greatest portion of the area, etc. The illumination sequence data generator may then determine which color to attribute to the light representation for the frame and/or set of frames at issue based at least in part on the representative color and, in examples, the capabilities associated with the light array. For example, some light arrays may be configured to display more colors and/or shades of colors than other light arrays. The illumination sequence data generator may utilize data associated with the light capabilities to determine a color that is most similar to the representative color determined for the light representation. In some examples, the determined color may be the representative color, such as in situations where the capabilities of the light array allow for emission of light having the representative color. In other examples, the determined color may be a variant of the representative color, such as in situations where the capabilities of the light array do not allow for emission of light having the representative color. This process may be repeated, in whole or in part, for the other frames and/or sets of frames associated with the selected portion of the content and/or for each of the other light representations in the visual representation. The result of this process may be light illumination data indicating colors to be emitted from the light array and/or color transitions.

In examples, the generation of illumination data may be performed in real time and/or in near real time from when the content utilized for generating the illumination data is to be output, such as by a video interface device. For example, a user may request output of the content on a video interface device. When requested and/or enabled, the content data may be received and utilized to generate the illumination sequence on the fly.

Additionally, or alternatively, the process 700 may include receiving third data indicating a device type of the device. The process 700 may also include determining, based at least in part on the device type, a reference arrangement of lights associated with the device type. The process 700 may also include causing display, using the user interface, of the reference arrangement of the lights associated with the device type. In these examples, receiving the first data may include receiving third input data confirming that the arrangement of the lights corresponds to the reference arrangement of the lights.

Additionally, or alternatively, the process 700 may include receiving third data indicating a set of light colors that the lights are configured to emit. The process 700 may also include determining, for a light of the lights, a first color representative of the area associated with the light. The process 700 may also include determining a second color of the set of light colors that is associated with the first color. In these examples, determining the color changes to associate with the visual representation may be based at least in part on the second color.

Additionally, or alternatively, the process 700 may include determining third data indicating a starting time for when the portion of the content is displayed. The process 700 may also include associating the third data with the second data such that the second data includes a command to cause the lights to initiate output of the color changes at the starting time while the portion of the content is being displayed on an image-output device.

Additionally, or alternatively, the process 700 may include sending, to the device, request data for the arrangement of the lights, wherein receiving the first data comprises receiving the first data based at least in part on the request data. The process 700 may also include generating, based at least in part on the first data, the visual representation of the lights based at least in part on the first data, the visual representation including, for individual ones of the lights, a light representation spaced to represent the arrangement of the lights.

Additionally, or alternatively, the process 700 may include causing the images to be displayed via the user interface with the visual representation overlaid on the images, the visual representation including, an indicator of the area to associate with individual ones of the lights. The process 700 may also include receiving, while the images are caused to be displayed, third input data indicating an increase or a decrease of the area. In these examples, determining the color changes may be based at least in part on an analysis of color associated with the area as increased or decreased as indicated by the third input data.

Additionally, or alternatively, the process 700 may include causing, based at least in part on the second data, the visual representation of the lights to display the color changes on the user interface. The process 700 may also include receiving third input data confirming the color changes. The process 700 may also include sending the second data to the device based at least in part on the third input data.

Additionally, or alternatively, the process 700 may include receiving, from a voice-enabled device, audio data representing a user utterance. The process 700 may also include determining, based at least in part on the audio data, that the user utterance indicates an intent to cause the device to emit colors from the lights. The process 700 may also include sending a command to the device, the command causing the device to utilize the second data to cause the lights to output the light indicating the color changes.

In examples, a request to cause the connected device to output the light sequence may be based at least in part on a voice command, user input to a graphical user interface, and/or based on other input types, such as recognition of a predefined pose, object, or movement sequence from image data acquired from a camera of a device located in an environment with the user. Additionally, given detected motion and/or movement sequences may be a trigger for causing the light sequence to initiate. In further examples, a gesture made with respect to a first connected device may cause a light sequence to initiate on another connected device in the same environment.

Figure 8:
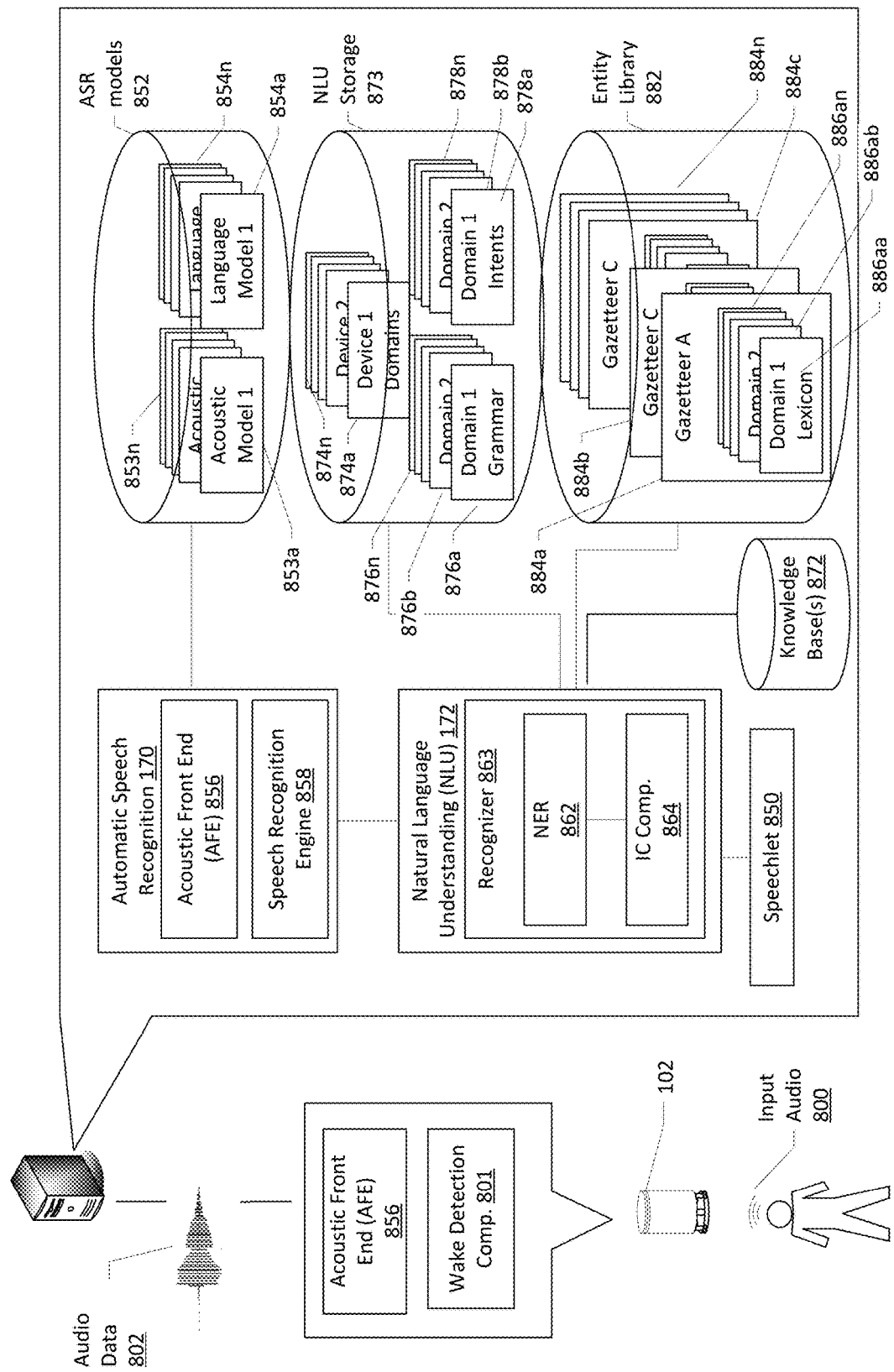
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 110). The various components illustrated may be located on a same device or different physical devices. Message between various components illustrated in FIG. 8 may occur directly or across a network 112. An audio capture component, such as a microphone 120 of the device 102, or another device, captures audio 800 corresponding to a spoken utterance. The device 102, using a wake word engine 801, then processes audio data corresponding to the audio 800 to determine if a keyword (such as a wakeword) is detected in the audio data. Following detection of a wakeword, the device 102 sends audio data 802 corresponding to the utterance to the remote system 110 that includes an ASR component 170. The audio data 802 may be output from an optional acoustic front end (AFE)

856 located on the device prior to transmission. In other instances, the audio data 802 may be in a different form for processing by a remote AFE 856, such as the AFE 856 located with the ASR component 170 of the remote system 110.

The wake word engine 801 works in conjunction with other components of the user device, for example a microphone to detect keywords in audio 800. For example, the device may convert audio 800 into audio data, and process the audio data with the wake word engine 801 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 110 for speech processing. Audio data corresponding to that audio may be sent to remote system 110 for routing to a recipient device or may be sent to the remote system 110 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 110, an ASR component 170 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 170 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 110 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Light Show A on Device A?" The wake detection component may identify the wake word, otherwise described as a trigger expression, "Alexa," in the user utterance and may "wake" based on identifying the wake word. Audio data corresponding to the user utterance may be sent to the remote system 110, where the speech recognition engine 858 may identify, determine, and/or generate text data corresponding to the user utterance, here "play Light show A on Device A."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 110, for natural language understanding (NLU) processing, such as conversion of the text into commands for execution, either by the user device, by the remote system 110, or by another device (such as a server running a specific application like a search engine, etc.).

The device performing NLU processing 172 (e.g., server 110) may include various components, including potentially dedicated processor(s), memory, storage, etc. As shown in FIG. 8, an NLU component 172 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 170 based on the utterance input audio 800) and attempts to make a semantic interpretation of the text. That is, the NLU process determines the meaning behind the text based on the individual words and then implements that meaning. NLU processing 172 interprets a text string to derive an intent or a desired action from the user as well as the pertinent pieces of information in the text that allow a device (e.g., device 102) to complete that action. For example, if a spoken utterance is processed using ASR 170 and outputs the text "play Light Show A on Device A" the NLU process may determine that the user intended have Device A output lights corresponding to "Light Show A."

The NLU 172 may process several textual inputs related to the same utterance. For example, if the ASR 170 outputs N text segments (as part of an N-best list), the NLU may process all N outputs to obtain NLU results.

As will be discussed further below, the NLU process may be configured to parse and tag to annotate text as part of NLU processing. For example, for the text "play Light Show A on Device A," "play" may be tagged as a command (to operate a connected device) and "Light Show A" may be tagged as the naming identifier of the light sequence to be output on Device A.

To correctly perform NLU processing of speech input, an NLU process 172 may be configured to determine a "domain" of the utterance so as to determine and narrow down which services offered by the endpoint device (e.g., remote system 110 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 172 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device.

For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (876) framework or frameworks may correspond to sentence structures such as "purchase item called 'Item A' from Marketplace A."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "identify this song," after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 850. The destination speechlet 850 may be determined based on the NLU output. For example, if the NLU output includes a command to send a message, the destination speechlet 134 may be a message sending application, such as one located on the user device or in a message sending appliance, configured to execute a message sending command. If the NLU output includes a search request, the destination speechlet 850 may include a search engine processor, such as one located on a search server, configured to execute a search command. After the appropriate command is generated based on the intent of the user, the speechlet 850 may provide some or all of this information to a text-to-speech (TTS) engine. The TTS engine may then generate an actual audio file for outputting the audio data determined by the speechlet 850 (e.g., "okay," or "Light Show A playing"). After generating the file (or "audio data"), the TTS engine may provide this data back to the remote system 110.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 172 during runtime operations where NLU operations are performed on text (such as text output from an ASR component 170). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 110, as illustrated herein are exemplary, and may be located in a stand-alone device or may be included, in whole or in part, as a component of a larger device or system, may be distributed across a network or multiple devices connected by a network, etc.

Figure 9:
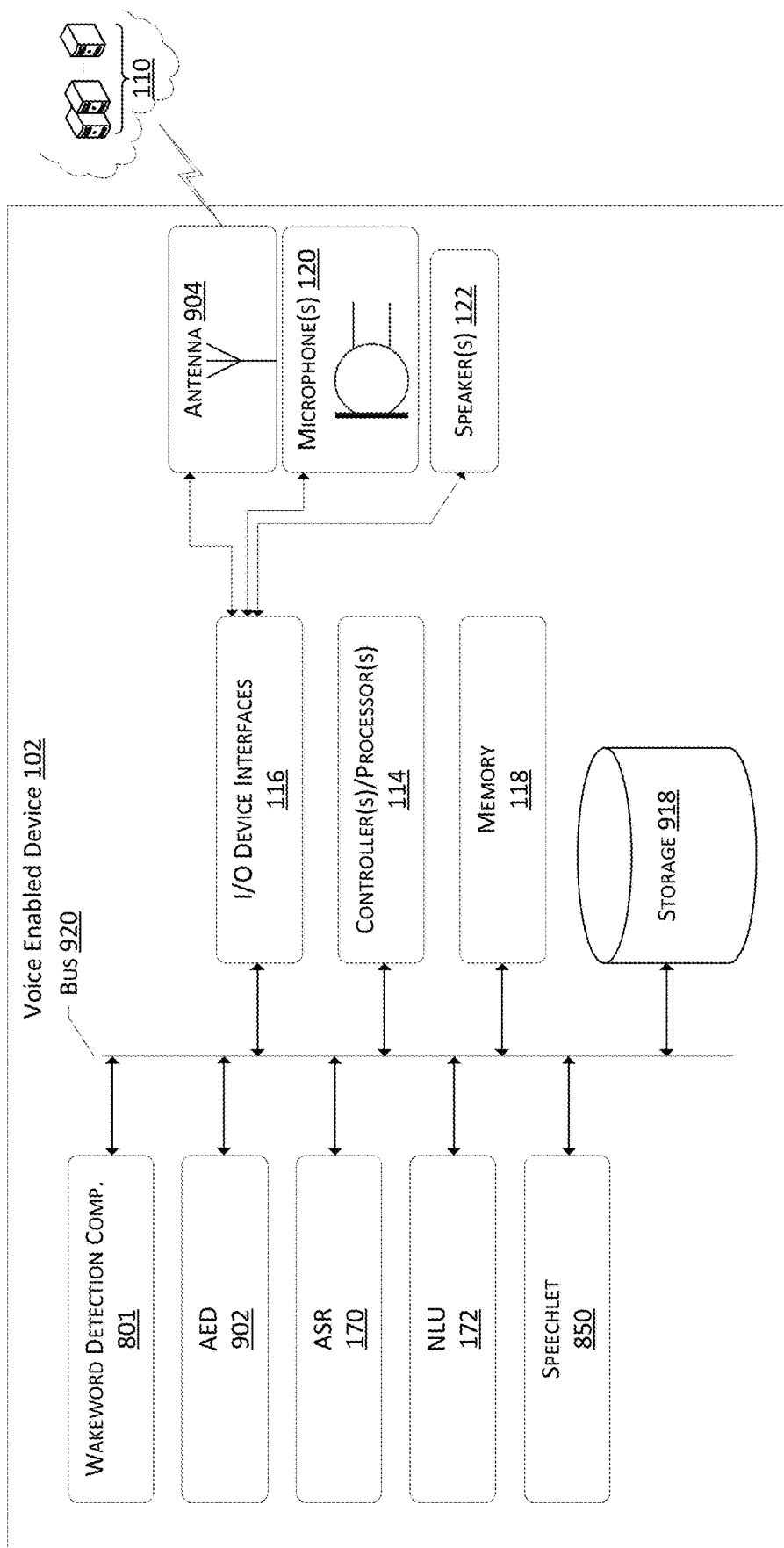
FIG. 9 illustrates a conceptual diagram of example components of a voice-enabled device that may be utilized in association with content-based light illumination.

FIG. 9 illustrates a conceptual diagram of example components of a voice-enabled device that may be utilized in association with content-based light illumination. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 120, a power source, and functionality for sending generated audio data via one or more antennas 904 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 120, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 114, that may include a central processing unit (CPU) for processing data and computer-readable instructions, and memory 118 for storing data and instructions of the device 102. The device 102 may also be connected to removable or external non-volatile memory and/or storage, such as a removable memory card, memory key drive, networked storage, etc., through input/output device interfaces 116.

Computer instructions for operating the device 102 and its various components may be executed by the device's controller(s)/processor(s) 114, using the memory 118 as temporary "working" storage at runtime. A device's computer instructions may be stored in a non-transitory manner in non-volatile memory 118, storage 918, or an external device(s). Alternatively, some or all of the executable instructions may be embedded in hardware or firmware on the device 102 in addition to or instead of software.

The device 102 may include input/output device interfaces 114. A variety of components may be connected through the input/output device interfaces 114. Additionally, the device 102 may include an address/data bus 920 for conveying data among components of the respective device. Each component within a device 102 may also be directly connected to other components in addition to, or instead of, being connected to other components across the bus 920.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 114 may comprise graphics processors for driving light sequence and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 116 that connect to a variety of components. This wired or a wireless audio and/or video port may allow for input/output of audio/video to/from the device 102. The device 102 may also include an audio capture component. The audio capture component may be, for example, a microphone 120 or array of microphones, a wired headset or a wireless headset, etc. The microphone 120 may be configured to capture audio. If an array of microphones is included, approximate distance to a sound's point of origin may be determined using acoustic localization based on time and amplitude differences between sounds captured by different microphones of the array. The device 102 (using microphone 120, wakeword detection component 801, ASR component 170, etc.) may be configured to generate audio data corresponding to captured audio. The device 102 (using input/output device interfaces 116, antenna 904, etc.) may also be configured to transmit the audio data to the remote system 110 for further processing or to process the data using internal components such as a wakeword detection component 801.

Via the antenna(s) 904, the input/output device interface 116 may connect to one or more networks 112 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 112, the speech-processing system may be distributed across a networked environment. Accordingly, the device 102 and/or the remote system 110 may include an ASR component 170. The ASR component 170 of device 102 may be of limited or extended capabilities. The ASR component 170 may include language models stored in ASR model storage component, and an ASR component 170 that performs automatic speech recognition. If limited speech recognition is included, the ASR component 170 may be configured to identify a limited number of words, such as keywords detected by the device, whereas extended speech recognition may be configured to recognize a much larger range of words.

The device 102 and/or the remote system 110 may include a limited or extended NLU component 172. The NLU component 172 of device 102 may be of limited or extended capabilities. The NLU component 172 may comprise a name entity recognition module, an intent classification module and/or other components. The NLU component 172 may also include a stored knowledge base and/or entity library, or those storages may be separately located.

In examples, AED 902 may also be performed by the device 102. In these examples, the operations may include causing the AED component 902 to be enabled or otherwise turned on, or the operations may include causing the AED component 902 to transition from a first mode to a second mode representing a higher sensitivity to audio data generated by the microphone 120. The AED component 902 may utilize the audio data generated by the microphone 120 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 902 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 902 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 110 may also include a speechlet 850 that is configured to execute commands/functions associated with a spoken command as described herein. The device 102 may include a wake word engine, which may be a separate component or may be included in an ASR component 170. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 122 and may utilize speaker(s) of an external or peripheral device to output audio via the speaker(s) of the external/peripheral device.

Figure 10:
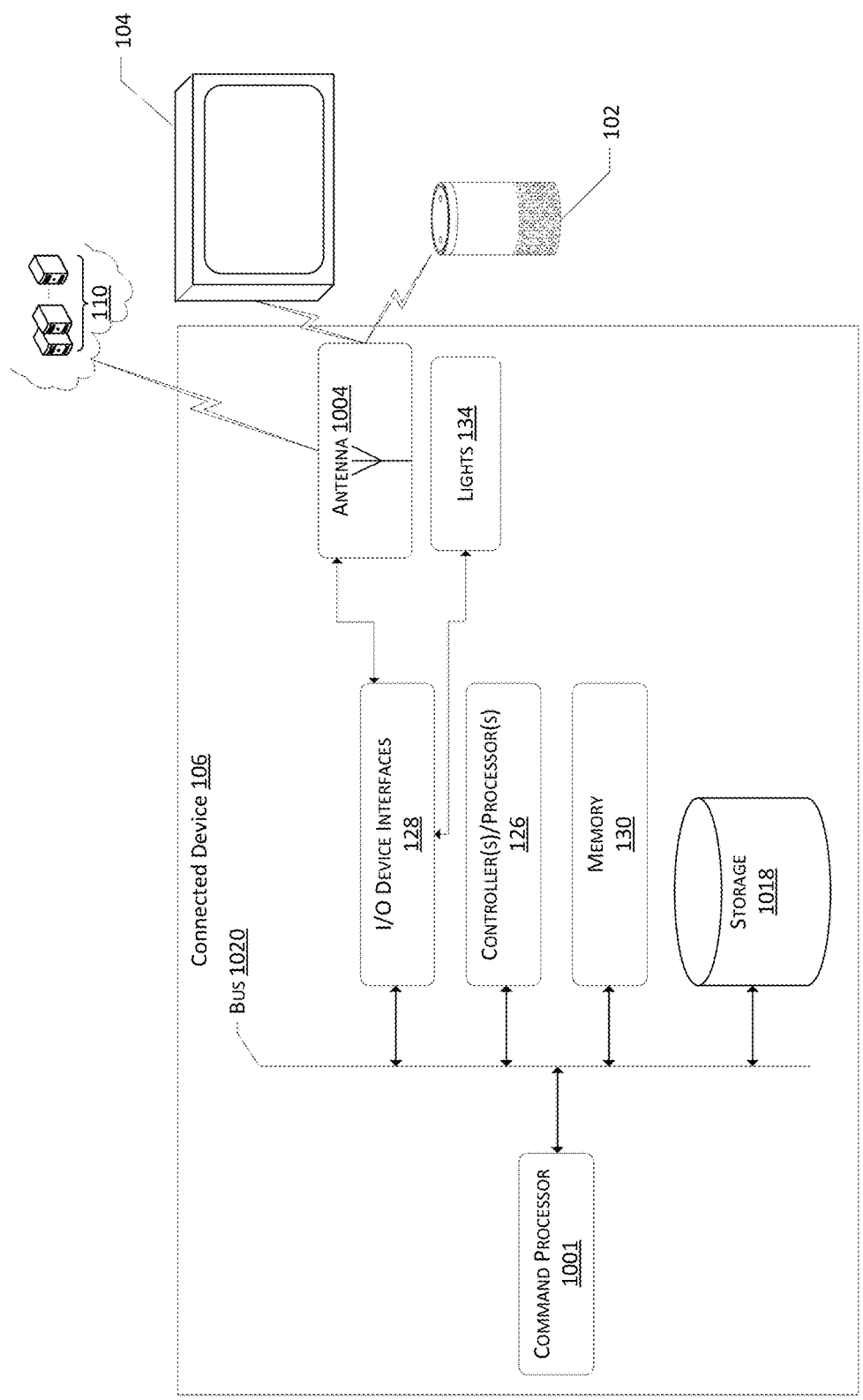
FIG. 10 illustrates a conceptual diagram of example components of a connected device that may be utilized in association with content-based light illumination.

FIG. 10 illustrates a conceptual diagram of example components of a connected device that may be utilized in association with content-based light illumination. For example, the device 104 may include a device that includes a light array. The device 106 may be implemented as a standalone device that is relatively simple in terms of functional capabilities with limited input/output components, memory, and processing capabilities. For instance, the device 106 may not have a keyboard, keypad, touchscreen, or other form of mechanical input. In some instances, the device 106 may include a microphone, a power source, and functionality for sending generated audio data via one or more antennas 1004 to another device and/or system.

The device 106 of FIG. 10 may include one or more controllers/processors 126, that may include a central processing unit (CPU) for processing data and computer-readable instructions, and memory 130 for storing data and instructions of the device 106. In examples, the skills and/or applications described herein may be stored in association with the memory 130, which may be queried for content and/or responses as described herein. The device 106 may also be connected to removable or external non-volatile memory and/or storage, such as a removable memory card, memory key drive, networked storage, etc., through input/output device interfaces 128.

Computer instructions for operating the device 106 and its various components may be executed by the device's controller(s)/processor(s) 126, using the memory 130 as "working" storage at runtime. A device's computer instructions may be stored in a non-transitory manner in non-volatile memory 130, storage 1018, or an external device(s). Alternatively, some or all of the executable instructions may be embedded in hardware or firmware on the device 104 in addition to or instead of software.

The device 106 may include input/output device interfaces 128. A variety of components may be connected through the input/output device interfaces 128. Additionally, the device 106 may include an address/data bus 1020 for conveying data among components of the respective device. Each component within a device 106 may also be directly connected to other components in addition to, or instead of, being connected to other components across the bus 1020.

The processor(s) 126 may comprise graphics processors for driving light sequence and video output on the associated lights and/or displays. As a way of indicating to a user that a connection between another device has been opened, the device 106 may be configured with one or more visual indicators, such as the light(s) 134, which may be in the form of LED(s) or similar components (not illustrated), that may change color, flash, or otherwise provide visible light output, such as for a notification indicator on the device 106. The device 106 may also include an audio capture component. The audio capture component may be, for example, a microphone or array of microphones, a wired headset or a wireless headset, etc. The microphone may be configured to capture audio. If an array of microphones is included, approximate distance to a sound's point of origin may be determined using acoustic localization based on time and amplitude differences between sounds captured by different microphones of the array. The device 106 (using input/output device interfaces 128, antenna 1004, etc.) may also be configured to transmit audio data to the remote system 110 for processing.

Via the antenna(s) 1004, the input/output device interface 128 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 106 via wired connection to an external alternating current (AC) outlet, and/or via onboard power sources, such as batteries, solar panels, etc.

The device 106 and/or the remote system 110 may also include a command processor 1001 that is configured to execute commands/functions as described herein. For example, one or more commands may be received by the device 106 from the remote system 110 and/or from another device such as a user device and/or the audio-input device. The command processor 1001 may receive the commands and utilize the components of the device 106 to process those commands. Such commands may cause the device 106 to output sound, such as via speakers.

Additionally, the device 106 may include one or more buttons. The buttons may allow for physical input, such as by a user of the device 106. The input may cause the processors 126 to perform one or more operations, such as causing the speakers to emit sound.

Figure 11:
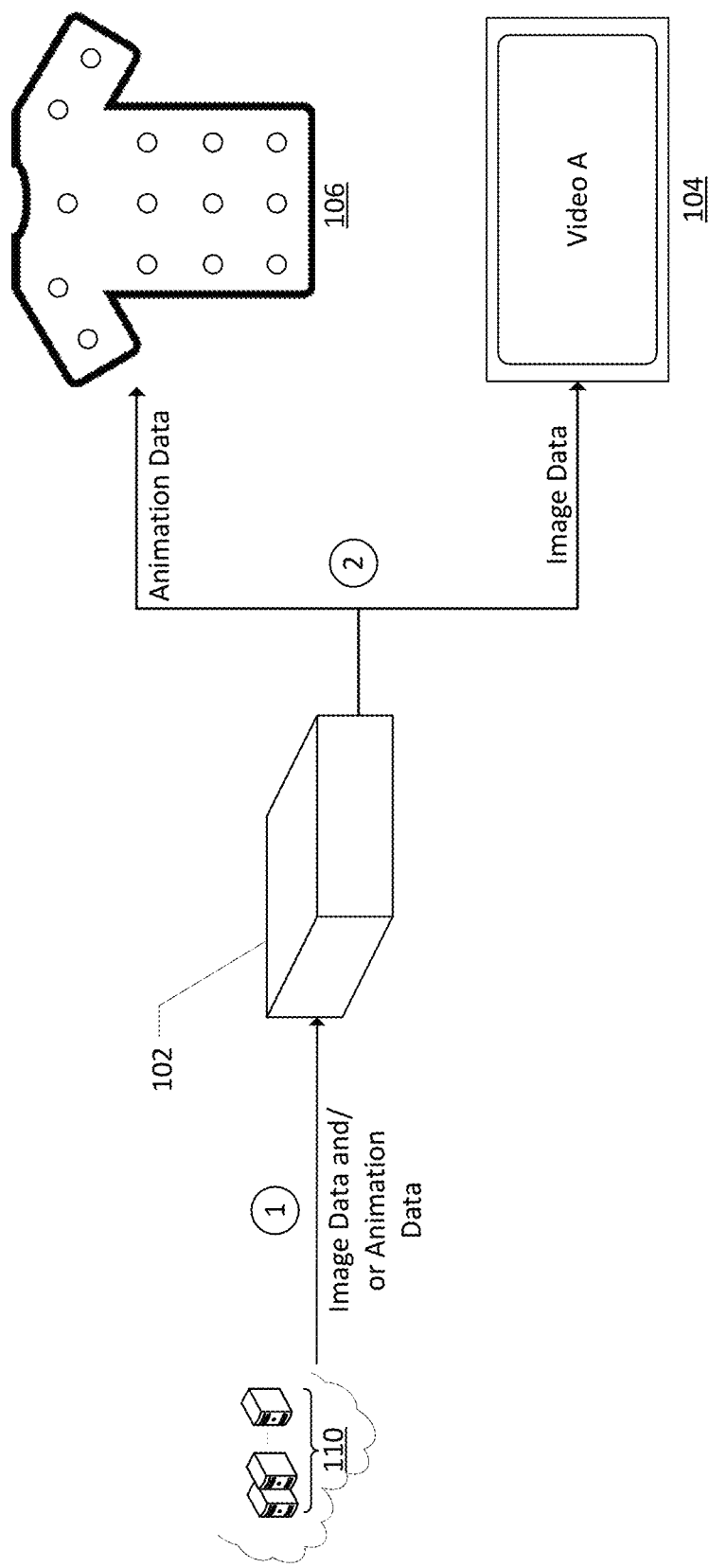
FIG. 11 illustrates a conceptual diagram of an example process for the synchronized output of images and lights associated with content-based light illumination.

FIG. 11 illustrates a conceptual diagram of an example process for the synchronized output of images and lights associated with content-based light illumination. The system 1100 may include at least some of the components of the system 100 from FIG. 1. For example, the system 1100 may include a voice enabled device 102 and/or another device configured to receive content data and/or illumination data, a video interface device 104 and/or a connected device 106, and/or a remote system 110. FIG. 11 depicts the exchange of information and/or the performance of processes via the various components utilizing steps 1 and 2. However, it should be understood that the processes may be performed in any order and need not be performed in sequential order as depicted in FIG. 11.

At step 1, content data, such as image data and audio data, may be sent from the remote system 110 to the device 102. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices perform a light illumination sequence associated with the video. Input data corresponding to the input may be sent to, for example, the remote system 110 configured to retrieve content associated with the request. In examples where the input comprises a user utterance, audio data corresponding to the user utterance may be sent to the remote system 110. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the device 102 for output. A retrieval component may retrieve the requested content and the remote system 110 may send the content to the device 102 and/or to the video interface device 104. The content, in a given example may include image data and illumination data. In other examples, the content may include just image data, just audio data, and/or other types of data, such as the illumination data.

At step 2, the device 102 may send data packets, such as image-data packets and/or light sequence data packets to the devices 104, 106. For example, the networking device 102 may receive the content data and may send all or a portion of the content data to the devices 104, 106. For example, the content data may include image data, which may be sent to the video interface device 104 and/or illumination data, which may be sent to the connected device 106. In these examples, the data may be sent to the devices 104, 106 as data packets utilizing one or more protocols.

The device 102, and/or the video interface device 104 may utilize the associations between time kept by the device 102 and time kept by the devices 104, 106 to determine how and when to send packets to the devices 104, 106 such that the video is output by the video interface device 104 in a time-synchronous manner with output of the light sequence on the connected device 106.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
   receiving a selection of a device from multiple devices configured with light arrays;
   determining light-configuration data representing a physical arrangement of a light array included in the device with respect to a shape of the device and a number of lights in the light array, the light-configuration data identifying the device as a wearable device;
   generating, from the light-configuration data, a user interface including a visual representation of the physical arrangement of the light array of the wearable device;
   receiving first user input data indicating selection of content to display, the content including image data representing a sequence of images;
   displaying, using the user interface, the visual representation of the light array overlaid on the sequence of images corresponding to the image data;
   receiving second user input data indicating parameters for determining color changes to associate with a first light of the lights, the parameters including:
   a section in the sequence of images to analyze over a period of time; and
   a selection of a displayed area of the section of the sequence of images to associate with individual lights in the visual representation;
   determining, utilizing the parameters, the color changes to associate with the first light, the color changes indicating changes in color from the displayed area of the sequence of images associated with the visual representation for the section of the sequence of images over the period of time;
   generating illumination data representing the color changes over the period of time;
   receiving audio data representing a voice command from a voice interface device associated with account data;
   determining, utilizing speech processing performed on the audio data, that the voice command corresponds to a request to output the content;
   determining, from the account data, that the content is associated with the illumination data; and
   sending, based at least in part on the voice command corresponding to the request to output the content and the account data indicating the content is associated with the illumination data, the illumination data to the wearable device, the illumination data configured to cause the color changes to occur when the wearable device is associated with an image-output device that is outputting the content.

2. The system of claim 1, the operations further comprising:
   receiving first data indicating a device type of the device;
   determining, from the device type, a reference number of lights associated with the device type;
   determining, from the device type, a reference shape associated with the device type;
   displaying, using the user interface, the reference number and the reference shape associated with the device type; and
   wherein determining the light-configuration data includes receiving third user input data confirming that:
   the number of the lights corresponds to the reference number of the lights; and
   the shape corresponds to the reference shape.

3. The system of claim 1, the operations further comprising:
   receiving light-capability data associated with the lights, the light-capability data indicating a set of light colors that the lights are configured to emit;
   determining, for the first light, a first color representative of the displayed area associated with the light;
   determining a second color of the set of light colors that is similar to the first color; and
   wherein determining the color changes to associate with the first light includes selecting the second color to associate with the first light.

4. The system of claim 1, the operations further comprising:
   determining timestamp data associated with the section of the images, the timestamp data indicating a starting time for when the section of the images is displayed; and
   associating the timestamp data with the illumination data such that the illumination data includes a command to cause the lights to initiate output of the color changes at the starting time while the section of the images is being displayed on the image-output device.

5. The system of claim 1, the operations further comprising:
   receiving second audio data representing a second voice command from the voice interface device;

determining, utilizing speech processing performed on the second audio data, that the second voice command corresponds to a request to pause outputting the content;

determining, from the account data, that the content is associated with the illumination data; and sending, based at least in part on the second voice command corresponding to the request to pause outputting the content and the account data indicating the content is associated with the illumination data, a command to the wearable device, the command configured to cause the wearable device to cease outputting the content.

6. The system of claim 1, the operations further comprising:

receiving second audio data representing a second voice command from the voice interface device;

determining, utilizing speech processing performed on the second audio data, that the second voice command corresponds to a request to output a particular section of the content;

determining, from the account data, that the particular section of the content is associated with the illumination data; and sending, based at least in part on the second voice command corresponding to the request to output a particular section of the content and the account data indicating the particular section of the content is associated with the illumination data, a command to the wearable device that causes the wearable device to cause the color changes to occur when the image-output device is outputting the particular section of content.

7. A method, comprising:

receiving a selection of a device from multiple devices configured with light arrays;

determining first data indicating a physical arrangement of lights in a light array of the device with respect to a shape of the device and a number of lights in the light array, the first data identifying the device as a wearable device;

generating, from the first data, a user interface including a visual representation of the physical arrangement of the light array of the wearable device;

receiving first input data indicating selection of content to display, the content including image data representing a sequence of images;

causing, using the user interface, the visual representation of the light array to be displayed as an overlay on the sequence of images corresponding to the image data;

receiving second input data indicating parameters for determining color changes to associate with a first light of the lights, the parameters including:
 a section in the sequence of images to analyze over a period of time; and
 a selection of a displayed area of the section of the sequence of images to associate with individual lights in the visual representation;

determining, based at least in part on the parameters, color changes to associate with the visual representation of the light array, the color changes indicating changes in color from the displayed area of the sequence of images for the section of the sequence of images over the period of time;

generating second data configured to be utilized by the device to cause the lights to output light with the color changes over the period of time;

receiving audio data representing a voice command from a voice interface device associated with account data;

determining, utilizing speech processing performed on the audio data, that the voice command corresponds to a request to output the content;

determining, from the account data, that the content is associated with the second data; and sending, based at least in part on the voice command corresponding to the request to output the content and the account data indicating the content is associated with the second data, the second data to the wearable device, the second data configured to cause the color changes to occur when the wearable device is associated with an image-output device that is outputting the content.

8. The method of claim 7, further comprising:

receiving third data indicating a device type of the device;

determining, based at least in part on the device type, a reference arrangement of lights associated with the device type;

causing display, using the user interface, of the reference arrangement of the lights associated with the device type; and wherein receiving the first data includes receiving third input data confirming that the physical arrangement of the lights corresponds to the reference arrangement of the lights.

9. The method of claim 7, further comprising:

receiving third data indicating a set of light colors that the lights are configured to emit;

determining, for the first light, a first color representative of the selection of the displayed area associated with the first light;

determining a second color of the set of light colors that is associated with the first color; and wherein determining the color changes to associate with the visual representation comprises determining the color changes based at least in part on the second color.

10. The method of claim 7, further comprising:

determining third data indicating a starting time for when the section of the sequence of images is displayed; and associating the third data with the second data such that the second data includes a command to cause the lights to initiate output of the color changes at the starting time while the section of the sequence of images is being displayed on the image-output device.

11. The method of claim 7, further comprising:

sending, to the device, request data for the physical arrangement of the lights, wherein receiving the first data comprises receiving the first data based at least in part on the request data; and generating, based at least in part on the first data, the visual representation of the lights based at least in part on the first data, the visual representation including, for the first light of the lights, a light representation spaced to represent the physical arrangement of the lights.

12. The method of claim 7, further comprising:

receiving, while the content is caused to be displayed, third input data indicating an increase or a decrease of the selection of the displayed area; and wherein determining the color changes comprises determining the color changes based at least in part on an analysis of color associated with the selection of the displayed area as increased or decreased as indicated by the third input data.

13. The method of claim 7, further comprising:
causing, based at least in part on the second data, the visual representation of the lights to display the color changes on the user interface;
receiving third input data confirming the color changes; and
sending the second data to the device based at least in part on the third input data.

14. A system, comprising:
one or more processors; and
non-transitory computer-readable media storing computer-executable instructions that, when executed by the one or more processors, cause the one or more processors to perform operations comprising:
receiving a selection of a device from multiple compatible devices having light arrays;
determining first data indicating a physical arrangement of lights in a light array of the device with respect to a shape of the device and a number of lights in the light array, the first data identifying the device as a wearable device;
generating, from the first data, a user interface including a visual representation of the physical arrangement of the light array of the wearable device;
receiving first input data indicating selection of content to display, the content including image data representing a sequence of images;
causing, using the user interface, the visual representation of the light array to be displayed as an overlay on the sequence of images corresponding to the image data;
receiving second input data indicating parameters for determining color changes to associate with a first light of the lights, the parameters including:
a section in the sequence of images to analyze over a period of time; and
a selection of a displayed area of the section of the sequence of images to associate with individual lights in the visual representation;
determining, based at least in part on the parameters, color changes in the content to associate with the visual representation of the light array, the color changes indicating changes in color from the displayed area of the sequence of images associated with the visual representation for the section of the sequence of images over the period of time;
generating second data configured to be utilized by the device to cause the lights to output light with the color changes over the period of time;
receiving audio data representing a voice command associated with account data;
determining, utilizing speech processing performed on the audio data, that the voice command corresponds to a request to output the content;
determining, from the account data, that the content is associated with the second data; and
sending, based at least in part on the voice command corresponding to the request to output the content and the account data indicating the content is associated with the second data, the second data to the wearable device, the second data configured to cause the color changes to occur on the wearable device when the wearable device is associated with an image-output device that is outputting the content.

15. The system of claim 14, the operations further comprising:
receiving third data indicating a device type of the device;
determining, based at least in part on the device type, a reference arrangement of lights associated with the device type;
causing display, using the user interface, of the reference arrangement of the lights associated with the device type; and
wherein receiving the first data includes receiving third input data confirming that the physical arrangement of the lights corresponds to the reference arrangement of the lights.

16. The system of claim 14, the operations further comprising:
receiving third data indicating a set of light colors that the lights are configured to emit;
determining, for the first light, a first color representative of the selection of the displayed area associated with the first light;
determining a second color of the set of light colors that is associated with the first color; and
wherein determining the color changes to associate with the visual representation comprises determining the color changes based at least in part on the second color.

17. The system of claim 14, the operations further comprising:
determining third data indicating a starting time for when the section of the sequence of images is displayed; and
associating the third data with the second data such that the second data includes a command to cause the lights to initiate output of the color changes at the starting time while the section of the sequence of images is being displayed on the image-output device.

18. The system of claim 14, the operations further comprising:
sending, to the device, request data for the physical arrangement of the lights, wherein receiving the first data comprises receiving the first data based at least in part on the request data; and
generating, based at least in part on the first data, the visual representation of the lights based at least in part on the first data, the visual representation including, for the first light of the lights, a light representation spaced to represent the physical arrangement of the lights.

19. The system of claim 14, the operations further comprising:
receiving, while the content is caused to be displayed, third input data indicating an increase or a decrease of the selection of the displayed area; and
wherein determining the color changes comprises determining the color changes based at least in part on an analysis of color associated with the selection of the displayed area as increased or decreased as indicated by the third input data.

20. The system of claim 14, the operations further comprising:
causing, based at least in part on the second data, the visual representation of the lights to display the color changes on the user interface;
receiving third input data confirming the color changes; and
sending the second data to the device based at least in part on the third input data.

* * * * *